United States Patent
Ohsawa et al.

[11] Patent Number: 6,118,621
[45] Date of Patent: Sep. 12, 2000

[54] MAGNETORESISTANCE EFFECT HEAD HAVING A PAIR OF PROTRUSIONS, STEPS OR DEPRESSIONS BETWEEN THE DETECTING AND NONDETECTING AREAS FOR IMPROVED OFF-TRACK CHARACTERISTICS

[75] Inventors: Yuichi Ohsawa, Tokyo; Hiroaki Yoda, Kawasaki, both of Japan

[73] Assignee: Kabushiki Kaisha Toshiba, Japan

[21] Appl. No.: 08/668,256

[22] Filed: Jun. 20, 1996

[30] Foreign Application Priority Data

Jun. 22, 1995 [JP] Japan .................................. 7-155866

[51] Int. Cl.[7] ........................................................ G11B 5/39
[52] U.S. Cl. .............................................................. 360/113
[58] Field of Search .................... 360/113, 125, 360/126; 324/252; 338/32 R

[56] References Cited

U.S. PATENT DOCUMENTS

| | | | |
|---|---|---|---|
| 5,296,987 | 3/1994 | Anthony et al. ........................ | 360/113 |
| 5,461,526 | 10/1995 | Hamakawa et al. ..................... | 360/113 |
| 5,471,358 | 11/1995 | Tadokoro et al. ....................... | 360/113 |
| 5,475,550 | 12/1995 | George ..................................... | 360/113 |
| 5,479,696 | 1/1996 | McNeil ............................... | 360/113 X |
| 5,600,518 | 2/1997 | Koga ........................................ | 360/113 |
| 5,668,685 | 9/1997 | Soeya et al. ............................. | 360/113 |

FOREIGN PATENT DOCUMENTS

| | | |
|---|---|---|
| 59-127217 | 7/1984 | Japan . |
| 3-283477 | 12/1991 | Japan . |
| 4-161874 | 6/1992 | Japan . |
| 6-267030 | 9/1994 | Japan . |

*Primary Examiner*—William R. Korzuch
*Attorney, Agent, or Firm*—Finnegan, Henderson, Farabow, Garrett & Dunner, L.L.P.

[57] ABSTRACT

A magnetoresistance effect head includes a magnetic film for detecting a signal magnetic field. The magnetic film has substantially flat upper and lower surfaces, a detecting area for detecting the signal magnetic field, and non-detecting areas formed on both sides of the detecting area. One pair selected from a group of a pair of protrusions, a pair of depressions, and a pair of steps are formed at edge portions in a track width direction of the detecting area on at least one of the upper surface and the lower surface.

22 Claims, 12 Drawing Sheets

6,118,621

MAGNETORESISTANCE EFFECT HEAD HAVING A PAIR OF PROTRUSIONS, STEPS OR DEPRESSIONS BETWEEN THE DETECTING AND NONDETECTING AREAS FOR IMPROVED OFF-TRACK CHARACTERISTICS

BACKGROUND OF THE INVENTION

1. Field of the Invention

The present invention relates to a magnetoresistance effect type head used as for example a reproducing head of a magnetic disk unit and a magnetic recording/reproducing head system therewith.

2. Description of the Related Art

In recent years, as needs of high density magnetic recording units are becoming strong, a hard disk type magnetic recording/reproducing head system having a reproducing head composed of a shield type magnetoresistance effect type head (hereinafter referred to as an MR type head) and a recording head composed of an induction type magnetic head has been developed. In addition, as an MR device, a giant magnetoresistance effect due to a spin dependent scattering effect was discovered. For example, an MR head composed of a spin valve film or an artificial lattice film has been experimentally used as a reproducing head.

In the above-described magnetic recording/reproducing head system, due to the flatness and fabrication process required for the reproducing head, a structure of which a recording head is formed above the reproducing head has been used. In this case, leads that supply a current to the reproducing head are composed of a conductor film with a thickness of around 100 to 300 nm. In addition, from a view point of S/N ratio, a structure of which the track width of the reproducing head is smaller than the track width of the recording head is conventionally used. The track distance of the reproducing track is conventionally defined by the width between the leads.

FIG. 18 is a sectional view showing a structure of a magnetic recording/reproducing head system having a conventional shield type MR head. Next, with reference to FIG. 18, a fabrication process of a conventional head will be described. A CoZrNb alloy film with a thickness of around 1.5 μm is formed as a lower shield layer 1 on a substrate (not shown) by the spattering method. The resultant structure is patterned in a shield shape by the ion etching method. An αAl$_2$O$_3$ film is formed as a lower reproducing gap 2 for a thickness of around 150 nm. A single film that has the MR effect or a laminate film (MR film) 3 is formed for a thickness of around 40 nm on the resultant structure and patterned in a stripe shape.

A Cu film or the like is formed as leads 4 for a thickness of around 100 nm on the stripe shaped MR film 3. A resist is coated on the resultant structure corresponding to the shape of the leads and then baked at a relatively high temperature. An ion beam is injected into the substrate with an angle so as to pattern the leads 4. The edge portions of the leads 4 are tapered so as to securely insulate the leads 4 and an upper shield layer. Thus, the film thickness of the leads gradually decreases. The distance between the tapered leads 4 becomes a reproducing track (T$_R$), namely, a signal detecting area.

An α-Al$_2$O$_3$ film is formed for a thickness of around 150 nm as an upper reproducing gap 5 and then patterned by the lift-off method. A CoZrNb alloy film is formed for a thickness of around 3 μm as a lower recording magnetic layer 6 that also functions as the upper shield layer and then patterned by the ion etching method. An αAl$_2$O$_3$ film is formed for a thickness of around 200 nm as a recording gap 7. A coil (not shown) is formed and then insulated. A CoZrNb alloy film is formed for a thickness of around 4 μm as an upper recording magnetic layer 8 and then patterned. In this example, a portion formed opposite to the lower recording magnetic layer 6 through the recording gap 7 of the upper recording magnetic layer 8 becomes a recording track (T$_W$). Thus, by the above-described fabrication process, a magnetic recording/reproducing head system of which a recording head is separated from a reproducing head is obtained.

The high record density of the magnetic recording/reproducing head system can be accomplished by narrowing the track width and the gap of the reproducing head. However, in the conventional head structure and fabrication process thereof shown in FIG. 18, there are various problems. In a structure of which the track width is narrowed, the following problem takes place. In the conventional magnetic recording/reproducing head system, the reproducing track T$_R$ is defined by the gap of the leads 4 and the width of the recording track T$_W$ is larger than the width of the reproducing track. In this case, the irregularity of the leads 4 for a thickness of around 100 nm are transferred to the upper reproducing gap 5, the upper shield layer/lower recording magnetic layer 6. Thus, the irregularity for a thickness of around 100 nm are formed in the vicinity of the edge portions of the recording track T$_W$.

To accomplish a high record density, as the track width decreases, the large irregularity in the vicinity of the edge portions of the track cause a recording fringe. In other words, when the track width is in the range from around 1 to 2 μm, the ratio of the protrusion portions and recess portions of the track edges in the record track width increases. Thus, a distorted area of the recorded medium magnetizing pattern increases and thereby the reproduced output decreases. On the other hand, in a structure of which the reproducing track is narrowed, the following problem takes place. Since the MR film 3 that overlays with the leads 4 also read information from the medium as well as the MR film 3 corresponding to the track portion, off-track characteristics deteriorate and the influence of the reproducing fringe becomes large.

On the other hand, in a structure of which the gap is narrowed as shown in FIG. 18, the tapers at the edge portions of the leads 4 are important to securely insulate the upper shield layer 6 from the leads 4. To gradually taper the edge portions of the leads 4, when the leads are formed by the ion etching method, the resist should be baked at a high temperature so as to taper the resist. Alternatively, when the MR film 3 is composed of a laminate film, the etching operation should be strictly controlled because the MR film 3 cannot be excessively etched. However, when the resist is baked at a high temperature, the interfacial diffusion takes place in the laminate film and thereby the resistance variation ratio decreases. When the resist is removed with an alkaline solution after the ion etching process is performed, the alkaline solution may corrode the laminate film (for example, a spin valve film). In addition, due to the deviation of the operation of the etching unit, the yield in the fabrication process for forming the leads 4 decreases.

Moreover, in the case of a spin valve film as a laminate film that has the giant magnetoresistance effect, an antiferromagnetic film composed of for example FeMn is normally formed above the spin valve film due to the crystalline orientation. In this case, since the antiferromagnetic film, a magnetic film in the spin valve film that exchange-bonds with the antiferromagnetic film, and a non-magnetic film composed of for example Cu are magnetically insensible, they function as an upper gap. When a conductive protection film is formed on the spin valve film, they function as a gap. Thus, the thickness of the insulation film as the upper gap becomes the difference between the designed gap length and the thickness of the portion that functions as the gap. Consequently, the thickness of the insulation film that is formed at the taper portions further decreases. As a result, the yield of the insulation further decreases.

Besides the structure of which the leads are formed above the MR film as shown in FIG. 18, other structures have been disclosed. In related art references as Japanese Patent Laid-Open Publication Nos. 3-283477 and 4-161874, leads are formed below an MR film. Alternatively, as another related art reference as Japanese Patent Laid-Open Publication No. 6-267030, leads are disposed below and above an MR film. In these structures, the MR film is formed on a flat base. However, when leads are formed above and below the MR film, irregularity of the leads are transferred to the upper shield layer. Thus, as with the structure of which the leads are formed above the MR film, in a structure of which the track and/or gap is narrowed, various problems take place. In addition, when the spin valve film is used, an antiferromagnetic film composed of for example FeMn for fixing the magnetization is formed above the spin valve film so as to obtain excellent characteristics. However, when leads are formed above the MR film, since a sense current flows at the interface between the antiferromagnetic film and the magnetic film, due to the influence of the electric field, heat, and so forth, the reliability of the magnetic fixation at the interface deteriorates. Thus, the structure of which leads are formed below the MR film is more advantageous over the structure of which the leads are formed above the MR film.

However, in the conventional head structure of which the leads are formed below the MR film, the following problem takes place. In the related art reference as Japanese Patent Laid-Open Publication No. 4-161874, an MR head of which the contacted surfaces of a pair of leads, an insulation film, and an MR film (the insulation film and the MR film are disposed between the leads) are flatly formed is described. In the related art reference as Japanese Patent Laid-Open Publication No. 3-283477, an MR head of which a flat MR film is formed on leads in parallel with a substrate is described. In the structure of which the leads are formed below the MR film, although a recording fringe of the recording head is prevented, when the reproducing track width is narrowed to around 1 to 2 $\mu$m for a high record density, the MR film corresponding to the leads also reads a signal from the medium and the influence of the reproducing fringe results in. In the head structures of the above-described related art references, the etch-back process or a combination of the bias-spatter process and the etch-back process is used to flatten the leads and the insulation layer formed therebetween. Thus, a much strict process control is required as a fabrication method. Thus, the yield of the fabrication will decrease.

As described above, in the conventional MR head of which the leads are formed above the MR film, when the track width is narrowed for a high record density, irregularity of the lead portion are transferred to portions in the vicinity of the edge portions of the recording track. The variation of the recording gap results in a recording fringe. In addition, a signal reproduced from the MR film that overlays with the leads are superimposed with a reproduced output signal, resulting in a reproducing fringe. Moreover, in a structure of which the gap is narrowed, a short-circuit takes place between the leads and the upper shield layer. This problem is especially remarkable when an MR film composed of a laminate film as a spin valve film or the like is used.

On the other hand, in the conventional structure of which the leads are formed below the MR film, although the recording fringe is suppressed, a signal read from the MR film that overlays with the leads cannot be suppressed. Thus, the reproducing fringe cannot be decreased. In addition, since the fabrication process should be strictly controlled, the yield of the fabrication tends to decrease.

SUMMARY OF THE INVENTION

The present invention is made from the above-described point of view. An object of the present invention is to provide a magnetoresistance effect type head that suppresses a reproducing fringe from taking place in a narrow gap structure and that allows the fabrication process to be stable.

Another object of the present invention is to provide a magnetoresistance effect type head as a recording/reproducing head system that allows the linearity of the gap of a recording head (surface flatness) to be maintained and that suppresses a recording fringe from taking place.

A further object of the present invention is to provide a magnetic recording/reproducing head system that allows a high record density and that has high recording/reproducing characteristics.

A first aspect of the present invention is a magnetoresistance effect type head, comprising a magnetic film for detecting a signal magnetic field, the magnetic film having substantially flat upper and lower surfaces, a detecting area for detecting the signal magnetic field, and non-detecting areas formed on both sides thereof, wherein one pair selected from a group of a pair of protrusions, a pair of depressions, and a pair of steps are formed at edge portions in a track width direction of the detecting area on at least one of the upper surface and the lower surface.

A second aspect of the present invention is a magnetoresistance effect type head, comprising a substrate, a base film formed on the substrate, a lower shield layer formed on the base film, an insulation film formed on the lower shield layer and having recess portions on both sides of a signal detecting area, a conductor film buried in the recess portions, a suppressing means formed at both the edge portions of the conductor film on the signal detection area side and adapted for suppressing a signal of other than the signal detecting area of a magnetic film from being transmitted to the signal detecting area, an upper insulation film formed on the magnetoresistance effect film, and an upper shield layer formed on the insulation film, wherein the front surfaces of the conductor film and the insulation film corresponding to the signal detecting area are formed on the same plane except for the suppressing means, and wherein the conductor film including the suppressing means, the magnetoresistance effect film formed on the front surface of the insulation film corresponding to the signal detecting area, and the interface of the magnetoresistance effect film and the conductor film are formed on the same plane except for the area of the suppressing means.

In the first and second aspects of the present invention, the height of the protrusions, the depressions, or the steps from the front surface of the detecting area is in the range from 1 to 10 nm.

The magnetoresistance effect type head according to the first aspect and the second aspect further comprises a spin valve film that is a laminate layer of a non-magnetic conductor film and a magnetic film formed on the magnetic film, the spin valve film being formed as a magnetoresistance effect film.

A third aspect of the present invention is a magnetic recording/reproducing head system, comprising a reproducing head composed of the magnetoresistance effect type head of the first and second aspects of the present invention, a lower magnetic layer adapted for magnetically shielding the magnetoresistance effect type head, and a recording head composed of an induction type magnetic head having an upper magnetic layer formed on the lower magnetic layer through a magnetic gap.

Since the magnetoresistance effect type head of the first aspect of the present invention comprises a magnetic film for detecting a signal magnetic field, the magnetic film having substantially flat upper and lower surfaces, a detecting area for detecting the signal magnetic field, and non-detecting areas formed on both sides thereof, wherein one pair selected from a group of a pair of protrusions, a pair of depressions, and a pair of steps are formed at edge portions in a track width direction of the detecting area on at least one of the upper surface and the lower surface, a signal read from the magnetic film that does not correspond to the signal detecting area can be suppressed from being transmitted to the signal detecting area.

In other words, as shown in FIG. 14, even if a signal magnetic field $H_{SIG}$ of an adjacent track enters areas A and C outside a signal detecting area B of the MR film 11 defined by a distance between leads corresponding to the conductor film 12 of the MR film 11 (namely, the signal magnetic field $H_{SIG}$ enters portion of which the MR film 11 overlays with the conductor film 12), the small depressions 13, small protrusions, or small steps formed at both edge portions in the track width direction of the signal detecting area B of the MR film 11 cause the magnetization to discontinue and thereby suppress the rotation of the magnetization. Thus, the small depressions 13 or the like suppress the signal of the adjacent track from being transmitted to the signal detecting area B. Consequently, in the structure of which the track width is narrowed, excellent off-track characteristics can be obtained and a reproducing fringe can be prevented from taking place.

On the other hand, as shown in FIG. 15, in the case that the MR film 11, the conductor film 12, and the interface of the conductor 12 and the insulation film 14 are completely flat, when a magnetic field $H_{SIG}$ of an adjacent tack enters areas A and C outside a sinal detecting area B of the MR film 11, the rotation of the magnetization of the MR film 11 of these areas is transferred to the signal detecting area B and thereby it is detected as a signal. In FIGS. 14 and 15, as the MR film 11, a spin valve film is shown. Reference numeral 15 is a magnetic film of which the magnetizing direction varies corresponding to the signal magnetic field. Reference numeral 16 is a non-magnetic conductor film. Reference numeral 17 is a magnetic film of which the magnetization is fixed by an antiferromagnetic film 18.

In this example, the height of the small protrusions, small depressions, and small steps is preferably in the range from 1 to 10 nm. When the height of the small protrusions, small depressions, and small steps is less than 1 nm, the signal magnetic field may not be satisfactorily suppressed from being transmitted. When the height of the small protrusions, small depressions, and small steps exceeds 10 nm, a Barkhausen noise may take place.

In the magnetoresistance effect type head of the second aspect of the present invention, a conductor film that supplies a current to a magnetic film that detects a signal magnetic field or a laminate film of a conductor film and a bias magnetic field applying film is formed in recess portions of an insulation film formed below the magnetic film, unevenness due to the forming of the conductor film for leads do not affect each of upper films. Thus, when a recording head is formed above the magnetoresistance effect type head, the recording gap can be linearly (flatly) formed. In addition, since the conductor film is formed below the magnetic film that detects a signal magnetic field, it is not necessary to form a conductive protection film (that prevents the magnetic film from corroding and being excessively milled during the fabrication process) on the magnetic film. Thus, a decrease of the resistance variation ratio due to a shunt of the sense current can be prevented.

In addition, since the conductor film or the laminate film of the conductor film and the bias magnetic field applying film is formed below the magnetic film that detects the signal magnetic field, an insulation defect does not normally take place at the edge portions of the conductor film.

Thus, the conductor film can be patterned as vertical tapers or almost vertical tapers. Consequently, in the laminate portion of the magnetic film and the conductor film, the sense current flows in the conductor film of the laminate portion of the magnetic film and the conductor film for the width of the signal detecting area. Thus, the effective track width can be much strictly controlled. In addition, a local heat generation due to the concentration of a current at the edges of the track width of the conductor film can be prevented and thereby the reliability can be improved.

In addition, when the conductor film or the laminate film of the conductor film and the bias magnetic field applying film is buried in the recess portions of which an insulation film is formed at least on the front surface thereof, the conductor film or the laminate film is insulated by the insulation film. Since the insulation film is formed on a flat surface, the quality thereof is superior to that of an insulation film that is tapered. Thus, electric insulation characteristics with high reliability can be obtained. Consequently, the gap can be narrowed with a high reliability.

In the magnetoresistance effect type head, the conductor film or the laminate film of the conductor film and the bias magnetic field applying film is formed below the magnetic film that detects a signal magnetic field. Protrusions, depressions, or steps are formed on the lower surface of the edge portions of the signal detecting area of the magnetic film opposite to the conductor film or the laminate film. Thus, the protrusions, depressions, or steps that improve the above-described off-track characteristics can be easily formed. Consequently, when a recording head is formed above the magnetoresistance effect type head, the recording gap can be almost linearly formed.

When the conductor film is formed only below the magnetic film that detects the signal magnetic field, the following advantages can be obtained in comparison with the structure of which conductor films are formed above and below the magnetic film.

In other words, when leads are formed below the MR film, the irregularity of the leads does not affect the upper reproducing gap and the upper shield layer. In addition, when a spin valve film is used as the MR film, as shown in FIG. 16, in portions (areas A and C) of which the spin valve film (MR film) 11 and the conductor film 12 (that becomes the leads) are laminated, currents ($I_1$ and $I_3$) selectively flow in respective portions of the conductor film 12 due to the difference of electric conductivities. On the other hand, a current ($I_2$) flows in the non-magnetic conductor film 16 at the center of the spin valve film 11 in the portion (area B) corresponding to the track width. Thus, the directions of the current magnetic fields applied to the antiferromagnetic film 18 on the spin valve film 11 and the ferromagnetic film 17 whose magnetization is fixed by the antiferromagnetic film 18 at the track width portion (area B) and the laminate portion of the leads and the spin valve film (areas A and C) become the same direction ($H_{f2}$ and $H_{f1}$; $H_{f3}$). Thus, when the direction of the sense current is properly selected, the direction of the current magnetic field becomes the same as the fixing direction of the magnetization of the antiferromagnetic film 18. Thus, the stability of the magnetizing direction of the antiferromagnetic film 18 increases. As a result, the reliability of the device improves. In FIG. 16, reference numeral 16 is a bias magnetic field applying film.

On the other hand, when leads are formed above and below the MR film, since the direction of the current that flows in the lower lead is the same as that of the upper lead, the effects of the current magnetic fields are offset. In addition, since the number of steps of the fabrication process increases, the cost rises.

Next, with reference to FIG. 17, the case of which an anisotropic magnetoresistance effect film is used as the MR film will be described. For example, in a head structure of which a horizontal bias applying method with a current shunt (shut bias method) is used, when a conductor film 12 for leads is formed only below an MR film 11, the directions of the current magnetic fields applied to the anisotropic magnetoresistance effect film as the MR film 11 at the laminate portion of the leads and the MR film (areas A and C) and the track width portion (area B) become the same direction ($H_{f1}$ and $H_{f3}$; $H_{f2}$). Thus, the magnetic domain of the MR film 11 becomes stable.

On the other hand, when leads are formed above and below the MR film, since the current that flows in the upper lead is the same as that in the lower lead, the effects of the current magnetic fields are offset. In addition, the number of steps of the fabrication process increases and thereby the cost rises. Thus, it is preferable to form the leads only below the MR film. In FIG. 17, reference numeral 20 is a shunt film that applies a horizontal bias magnetic field due to a shunt current to the MR film 11.

According to the magnetoresistance effect type head of the present invention, since a recording head composed of the induction type magnetic head is formed above a reproducing head composed of the magnetoresistance effect type head, even in a structure of which the track width is narrowed or the gap is narrowed, the linearity of the gap of the recording head is maintained. In addition, as described above, excellent off-track characteristics can be obtained. Thus, recording/reproducing characteristics corresponding to a high recording density can be obtained.

These and other objects, features and advantages of the present invention will become more apparent in light of the following detailed description of best mode embodiments thereof, as illustrated in the accompanying drawings.

DESCRIPTION OF THE PREFERRED EMBODIMENTS

Next, embodiments of the present invention will be described.

First Embodiment

Figure 1:
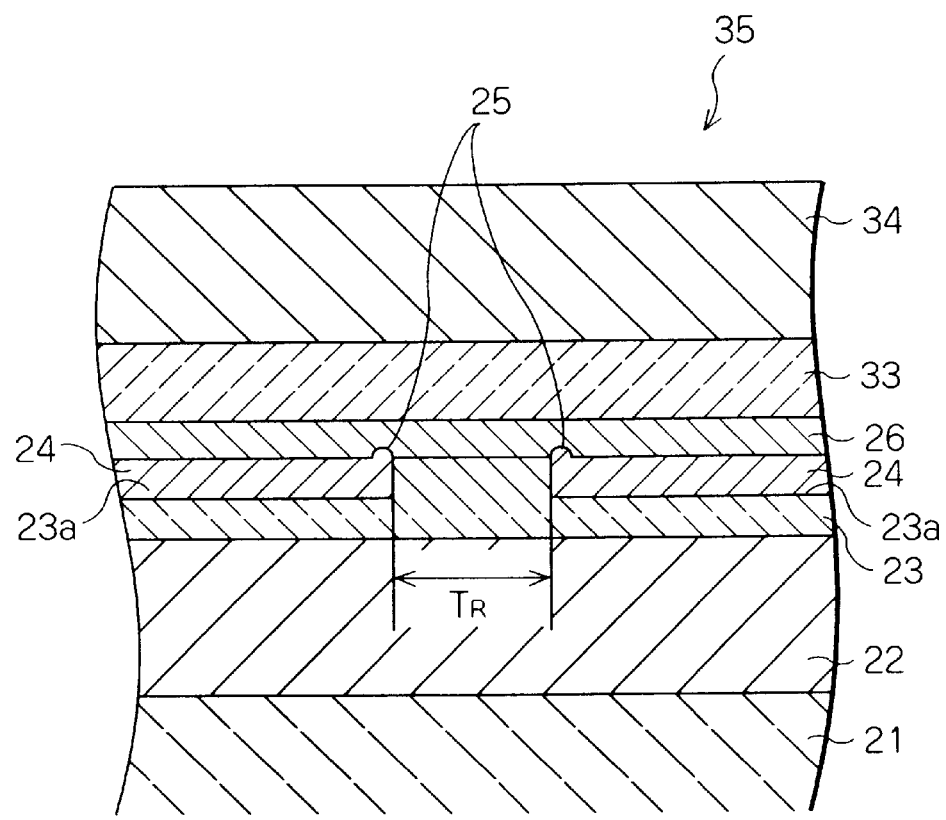
FIG. 1 is a sectional view showing a structure of principal portions of a shield type MR head according to a first embodiment of the present invention.

FIG. 1 is a sectional view showing a structure of a magnetoresistance effect type head according to a first embodiment of the present invention. The magnetoresistance effect type head shown in FIG. 1 is viewed from a medium side. In FIG. 1, reference numeral 21 is an $Al_2O_3$ film formed for a thickness of around 10 μm as a base film on an $Al_2O_3$.TiC mixture substrate (not shown). The Al$_2$O$_3$.TiC mixture substrate is hereinafter referred to as an altic substrate. A lower shield layer 22 composed of a soft magnetic material such as a NiFe alloy or a CoZrNb alloy is formed for a thickness of around 2 μm on the lower base film 21. An insulation film 23 composed of for example Al$_2$O$_3$ is formed for a thickness of around 150 nm on the lower shield layer 22. The insulation film 23 functions as a lower magnetic gap and a recess portion forming film for forming leads.

Recess portions 23a are formed for a thickness of around 100 nm on both sides of a signal detecting area (namely, a reproducing track T$_R$). A conductor film 24 composed of for example Cu is buried as leads in the recess portions 23b. Small protrusion portions 25 are formed for a height of around 3 nm at edge portions of the conductor film 24 on the reproducing track T$_R$ side. Except for the small protrusion portions 25, the upper surfaces of the conductor film 24 and the portion of the reproducing track T$_R$ of the insulation film 23 is flattened as an MR film forming surface. The gap length is the thickness of the insulation film 23 corresponding to the reproducing track T$_R$. In this example, the gap length is 150 nm. The lower shield layer 22 and the conductor film 24 are insulated by the insulation film 23 (with a thickness of 50 nm) formed below the recess portions 23a.

An MR film 26 is formed on the conductor film 24 and the insulation film 23 that have been flattened so that the MR film 26 contacts a pair of leads (the conductor films 24). In other words, the MR film 26 is formed so that the lower surface of the portion of the reproducing track T$_R$ defined by the distance between the pair of leads (the conductor films 24) is formed nearly on the same plane of the front surface of the conductor films 24. Small depressions are formed on the lower surface of the MR film 26 by the small protrusion portions 25 of the conductor film 24 on the outer portions of the reproducing track T$_R$.

Figure 2:
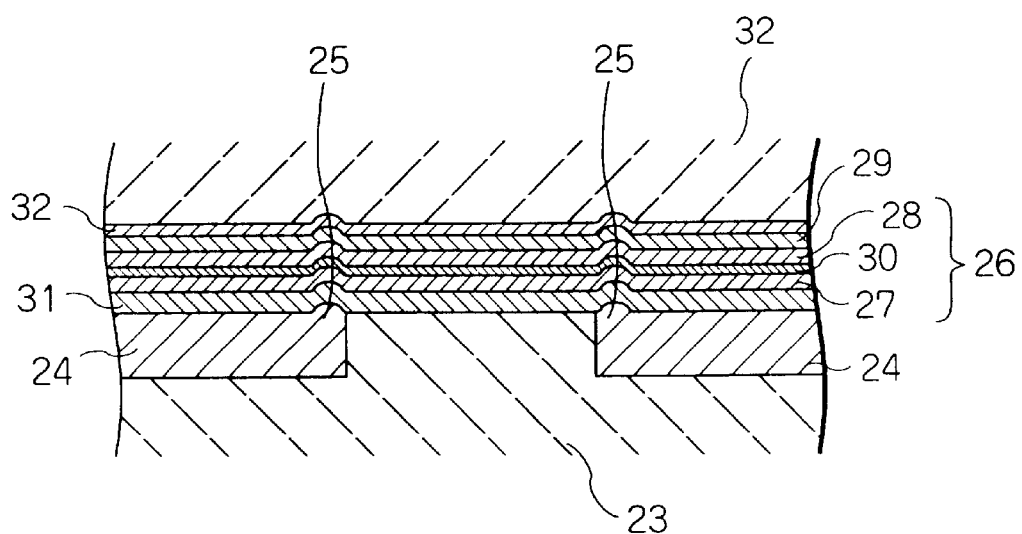
FIG. 2 is a sectional view showing a structure of an MR film of the shield type MR head shown in FIG. 1.

Examples of the MR film 26 are an anisotropic magnetoresistance effect type film, a spin valve film, and an artificial lattice film. The anisotropy magnetoresistance effect type film is composed of for example Ni$_{80}$Fe$_{20}$ of which the electric resistance varies corresponding to the angle between the current direction and the magnetizing moment of the magnetic layer. The spin valve film has a laminate structure of a magnetic film and a non-magnetic conductor film for example a Co$_{90}$Fe$_{10}$/Cu/Co$_{90}$Fe$_{10}$ laminate film of which the electric resistance varies corresponding to the angle of the magnetization of each magnetic layer. The artificial lattice film has the giant magnetoresistance effect. As shown in FIG. 2, the spin valve film as the MR film 26 has a laminate structure of for example a magnetic film 27, a magnetic film 28, and a non-magnetic conductor film 30. The magnetic film 27 is composed of for example a Co$_{90}$Fe$_{10}$ film of which the magnetizing direction varies corresponding to the signal magnetic field. The magnetic film 28 is composed of for example a Co$_{90}$Fe$_{10}$ film of which the magnetization is fixed by an antiferromagnetic film 29 composed of for example a FeMn film. The non-magnetic conductor film 30 is composed of for example a Cu film. In Fig., reference numeral 31 is a soft magnetic film such as a CoZrNb film. Reference numeral 32 is a protection film such as a Ti film. According to the present invention, the magnetic films that detect signal magnetic fields are for example an anisotropic magnetoresistance effect film as the MR film 26 shown in FIG. 1 and a magnetic film 27 of which the magnetizing direction varies corresponding to the signal magnetic field in the spin valve film shown in FIG. 2.

When the spin valve film is used as the MR film 26, as shown in FIG. 2, since the thickness of each film that composes the spin valve film is very thin, protrusions, depressions, and steps on the lower surface of the spin valve film can be transferred to the upper magnetic film of the spin valve film. Thus, when the upper magnetic film 28 is used as a magnetic film that detects a signal magnetic field, small protrusions, depressions, or steps can be easily formed on the magnetic film.

An insulation film 33 that is composed of for example Al$_2$O$_3$ and that functions as an upper magnetic gap is formed on the MR film 26. An upper shield layer 34 composed of a soft magnetic material that is the same as the material of the lower shield layer 22 is formed on the resultant structure. Thus, a shield type MR head 35 that functions as a reproducing head is obtained.

The above-described shield type MR head 35 is fabricated for example in the following manner. Next, with reference to FIGS. 3A to 3E, the fabrication process of the head according to the first embodiment will be described.

An Al$_2$O$_3$ film is formed for a thickness of around 10 μm as a base film 21 on an altic substrate (not shown). By the sputter method, a lower shield layer 22 composed of for example a CoZrNb alloy is formed for a thickness of around 2 μm on the base film 21. An insulation film 23 that is composed of for example Al$_2$O$_3$ and that functions as a lower magnetic gap and a recess portion forming film for forming leads is formed for a thickness of around 150 nm on the resultant structure (see FIG. 3A).

A resist 36 is formed corresponding to the shapes of the reproducing track T$_R$ and the leads. The resist 36 is preferably formed in a inversed taper shape. With a mask of the resist 36, the insulation film 23 is etched with Ar ions by the ion milling method for a thickness of around 100 nm. Thus, recess portions 23a are formed (see FIG. 3B). With the resist 36 left, a conductor film 24 composed of for example a Cu film is formed for a thickness of around 100 nm is formed on the insulation film 23 including the resist 36 (see FIG. 3C). Thus, the conductor film 24 is buried in the recess portions 23a.

Figure 3A:
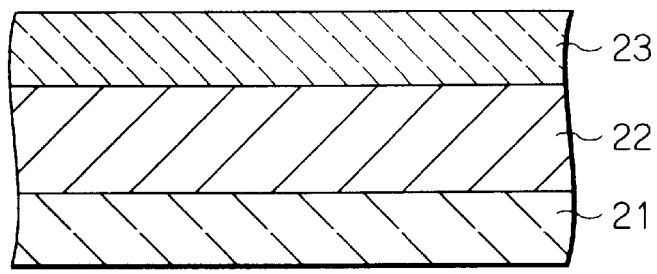
FIGS. 3A, 3B, 3C, 3D, and 3E are sectional views showing major steps of a fabrication process of the shield type MR head shown in FIG. 1.
Figure 3B:
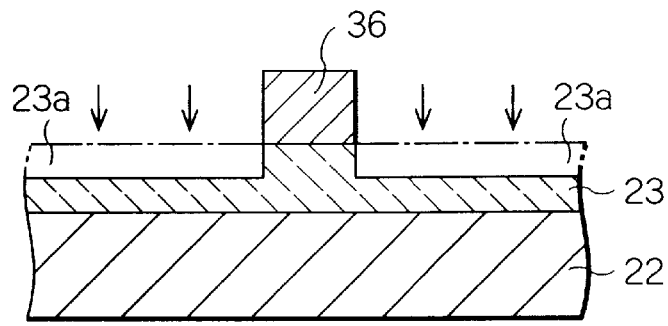
Figure 3C:
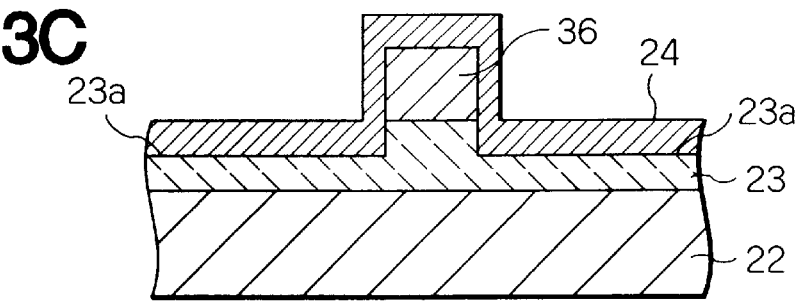
Figure 3D:
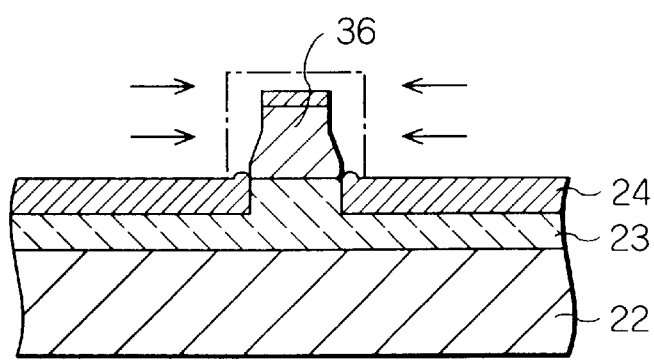
Figure 3E:
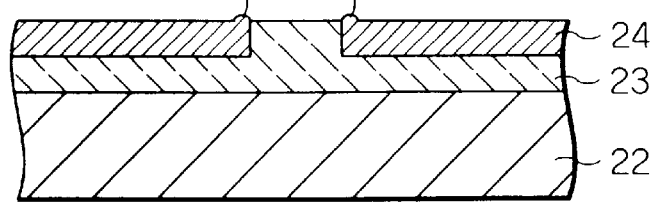

With an ion injection angle of 80 degrees, by the ion milling method, the conductor film 24 formed on the side surfaces of the resist 36 is selectively etched (see FIG. 3D). With such a low ion injection angle, the conductor film 24 formed in the recess portions 23a are not almost etched. The resist 36 is excessively side-etched and then the resist 36 is peeled out. Thus, a flat MR film forming surface is obtained. In addition, small protrusion portions 25 with a thickness of around 3 nm are formed at the edge portions of the conductor film 24 on the reproducing track side (see FIG. 3E).

An MR film 26 is formed on the resultant structure. Thus, the MR film 26 with the small depressions formed on the outer portions of both edges of the reproducing track T$_R$ can be obtained. The MR film 26 is patterned. An insulation film 33 composed of for example Al$_2$O$_3$ and an upper shield layer 34 composed of for example a CoZrNb alloy are successively formed on the resultant structure. The insulation film 33 functions as an upper magnetic gap. Thus, the shield type MR head 35 shown in FIG. 1 is obtained. Before the MR film 26 is formed, it is preferably to perform an ion cleaning process by for example the sputter etching method.

In the above-described embodiment, the recess portions 23a in which the conductor film 24 is buried are formed by the ion milling method. However, it should be noted that the recess portions 23a can be formed by the reactive ion etching (RIE) method, the chemical dry etching (CDE) method, or a combination thereof.

Figure 4:
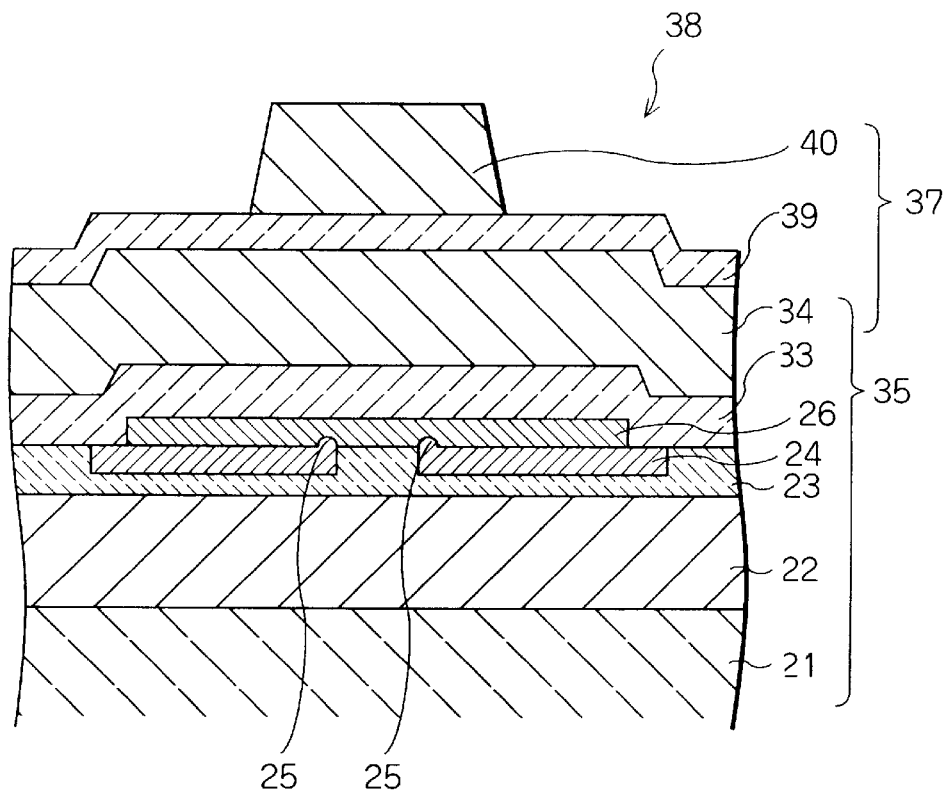
FIG. 4 is a sectional view showing a magnetic recording/reproducing head system having the shield type MR head shown in FIG. 1.

As shown in FIG. 4, a recording head composed of a induction type magnetic head 37 is formed on a reproducing head composed of the shield type MR head 35. As a result, a magnetic recording/reproducing head system 38 is obtained.

In other words, the upper shield layer 34 of the shield type MR head 35 functions as a lower magnetic layer of the induction type magnetic head 37. An upper magnetic layer 40 is formed on the upper shield layer 34 whose upper surface is flat and functions as a lower magnetic layer through a recording magnetic gap of an insulation film 39 composed of for example $Al_2O_3$. The upper magnetic layer 40 and the insulation film 39 formed therebelow are formed on a flat base. Thus, the linearity (flatness) of the recording magnetic gap of the induction type magnetic head 37 is maintained.

In the shield type MR head 35 according to the first embodiment, the conductor film 24 that supplies a current to the MR film 26 is buried in the recess portions 23a formed in the insulation film 23. The upper surfaces of the conductor film 24 and the insulation film 23 are flatly formed. The MR film 26 is formed on the conductor film 24 and the insulation film 23. Thus, each film disposed on the MR film 26 can be formed on respective flat bases. Consequently, as shown in FIG. 4, when the recording head composed of the induction type magnetic head 37 is formed on the reproducing head composed of the shield type MR head 35, the linearity of the magnetic gap of the recording head can be maintained. Consequently, in a structure of which the track is narrowed for a high record density, a record fringe can be suppressed. In addition, since the conductor film 24 is formed below the MR film 26, it is not necessary to form a conductive protection film on the MR film 26 so as to prevent the MR film 26 from corroding and from being excessively milled during the fabrication process. Thus, the decrease of the resistance variation ratio due to a shunt of the sense current can be prevented.

In addition to the structure for which the track width is narrowed, small depressions corresponding to the small protrusion portions 25 of the conductor film 24 are formed outside of both edge portions of the reproducing track $T_R$ of the MR film 26. Thus, even if a signal magnetic field of the adjacent track enters the MR film 26 outside the reproducing track $T_R$ (off-track portion), the signal magnetic field can be suppressed from being transmitted to the reproducing track $T_R$. Consequently, in the structure of which the track width is narrowed, excellent off-track characteristics can be obtained and a reproducing fringe can be prevented. Depending on conditions of the shape of the recess portions 23a, the forming method of the conductor film 24, and the milling angle, small depression portions may be formed instead of the small protrusion portions 25 of the conductor films 24. In the case of the small depression portions, the material of the MR film 26 buried in the small depression portions functions as small protrusions. In such a structure, excellent off-track characteristics can be obtained. The size of the small protrusions and small depressions is preferably in the range from 1 to 10 nm. When the size of the small protrusions and depressions is less than 1 nm, the transmission suppressing effect of the signal magnetic field may not be satisfactorily obtained. When the size of the small protrusions and depressions exceeds 10 nm, a Barkhausen noise may take place. The size of the small protrusions and depressions is more preferably in the range from 1 to 5 nm.

Moreover, since the conductor film 24 is buried in the recess portions 23a formed in the insulation film 23, an insulation defect does not basically take place at edge portions of the conductor film 24. Thus, the conductor film 24 can be patterned vertically or almost vertically. A sense current flows in the conductor film 24 of the laminate of the MR film 26 and the conductor film 24 to the very limit near the width of the reproducing track $T_R$. Since the conductor film has not taper portions as the conventional leads, it is possible to prevent the resistance of the leads from gradually increasing. Thus, a local heat generation can be prevented. Consequently, since the effective track width can be strictly controlled, the reliability of the head can be improved.

The conductor film 24 and the lower shield layer 22 are insulated by the insulation film 23. The insulation film 23 can be formed at a flat portion of the lower shield layer 22. Thus, the quality of the insulation film 23 is improved in comparison with that of the conventional insulation film with the taper portions. Consequently, high electric insulation characteristics can be obtained. As a result, with a high reliability, the gap can be narrowed.

In the flattening process of the conductor film 24, with the resist 36 is left, the conductor film 24 is formed. An ion beam is injected into the conductor film 24 on side surfaces of the resist 36 so as to etch the conductor film 24. This method can be more easily performed than the conventional etch-back method. In addition, the small protrusion portions 25 can be formed with a high reproducibility. Thus, a flat MR film (26) forming surface except for the small protrusion portions 25 can be obtained with a high yield.

When the insulation film 23 is formed on the flat lower shield layer 22 by for example the bias sputter method or the ion beam sputter method, the insulation film 23 may be composed of an $Al_2O_3$ film with a thickness of around 110 nm. The recess portions 23 may be formed for a depth of around 90 nm by the milling process. Thus, the insulation film 23 can insulate the conductor film 24 from the lower shield layer 22. Consequently, an MR head with a gap length of around 110 nm can be obtained.

When a spin valve film is used as the MR film 26, due to the crystalline orientation, it is preferable to form an antiferromagnetic film 29 composed of for example FeMn on the magnetic film 28. In this case, since the antiferromagnetic film 29, the magnetic film 28 (that exchange-couples with the antiferromagnetic film 29), and the non-magnetic conductive film 30 of the spin valve film are magnetically insensible, they function as an upper magnetic gap. However, since the upper surface of the MR film 26 is flat, a thin insulation film 33 can be formed with a high reliability.

Depending on the conditions of the fabrication process, the surface roughness of the insulation film 23 may be larger than the surface roughness of the conductor films 24. In this case, the magnetic film 27 (of which the magnetization is rotated) of the spin valve film corresponding to the off-track portion and the magnetic film 28 (of which the magnetization is fixed) are exchange-coupled to some extent. Thus, the magnetization of the magnetic film 27 hardly moves corresponding to the signal magnetic field. In addition, the coercive force of the magnetic film 27 increases and thereby the magnetization of the magnetic film 27 hardly moves corresponding to the external magnetic field. Consequently, the off-track portion hardly senses the signal magnetic field. Thus, the off-track characteristics are further improved.

Second Embodiment

Figure 5:
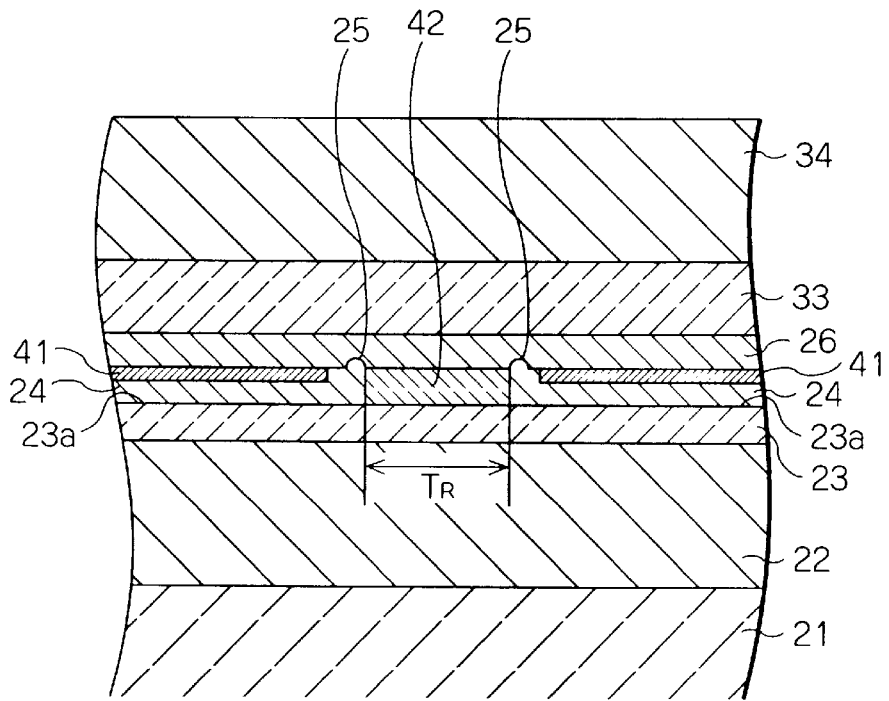
FIG. 5 is a sectional view showing a structure of principal portions of a shield type MR head according to a second embodiment of the present invention.

Next, with reference to FIG. 5, a shield type MR head according to a second embodiment of the present invention will be described. In the shield type MR head according to the second embodiment, a bias magnetic field applying film 41 that applies a bias magnetic field to an MR film 26 is formed between a conductor film 24 and the MR film 26. The bias magnetic field applying film 41 is a hard magnetic film composed of for example CoPt or an antiferromagnetic film. The bias magnetic field applying film 41 is buried in recess portions 23a so that the top surface of the bias magnetic field applying film 41 is formed on almost the same plane as the lower surface of a reproducing track $T_R$ of the MR film 26.

Except for the portion in the vicinity of the reproducing track $T_R$, a laminate layer of the conductor film 24 and the bias magnetic field applying film 41 is buried in the recess portions 23a. The bias magnetic field applying film 41 is formed almost flat with an MR forming surface. Small depressions outside of edge portions of the reproducing track $T_R$ of the MR film 26 are formed by small protrusions 25 of the conductor film 24. Alternatively, the bias magnetic field applying film 41 is formed up to the edge portions of the reproducing track $T_R$. The small protrusion portions 25 may be composed of the bias magnetic field applying film 41. At this point, the small protrusion portions 25 of the conductor film 24 are transferred to the bias magnetic field applying film 41 so as to form small depressions of the MR film 26.

In the shield type MR head according to the second embodiment, an insulation film 42 composed of a material different from that of the insulation film 23 is formed thereon so as to form the recess portions 23a and the portion of the reproducing track $T_R$. At this point, when the etching ratio of the insulation film 42 is larger than that of the insulation film 23, the depth of the recess portions 23a can be precisely controlled. The etching ratio of the insulation film 42 is preferably 1.5 times larger than that of the insulation film 23. When the insulation film 23 is composed of $Al_2O_3$, the insulation film 42 is composed of for example $SiO_2$.

The shield type MR head according to the second embodiment is fabricated in the following manner. Next, with reference to FIGS. 6A, 6B, 6C, 6D, and 6E, a fabrication process of the head according to the second embodiment will be described.

An $Al_2O_3$ film is formed for a thickness of around 10 μm as a base film 21 on an altic substrate (not shown). By the sputter method, a lower shield layer 22 composed of for example a CoZrNb alloy is formed for a thickness of around 2 μm on the base film 21. An insulation film 23 composed of $Al_2O_3$ for a thickness of around 50 nm and an insulation film composed of $SiO_2$ for a thickness of around 100 nm are successively formed (see FIG. 6A).

A resist 36 is formed corresponding to the shapes of a reproducing track $T_R$ and leads. The resist 36 is preferably formed in an inversed taper shape. With a mask of the resist 36, an insulation film 42 composed of $SiO_2$ is etched by the CDE method with carbon fluoride gas such as $CF_4$, by the RIE method with a mixture gas of $O_2$ and $H_2$, or by the ion milling method with Ar ions. Thus, recess portions 23a are formed (see FIG. 6B). At this point, the selected etching process is performed in such a manner that the etching ratio of the upper insulation film 42 composed of $SiO_2$ is larger than that of the lower insulation film 23 composed of $Al_2O_3$. Thus, the etching depth (namely, the depth of the recess portions 23a) can be precisely controlled.

Figure 6A:
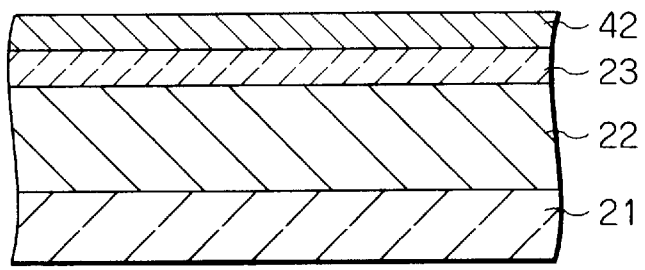
FIGS. 6A, 6B, 6C, 6D, and 6E are sectional views showing major steps of a fabrication process of the shield type MR head shown in FIG. 5.
Figure 6B:
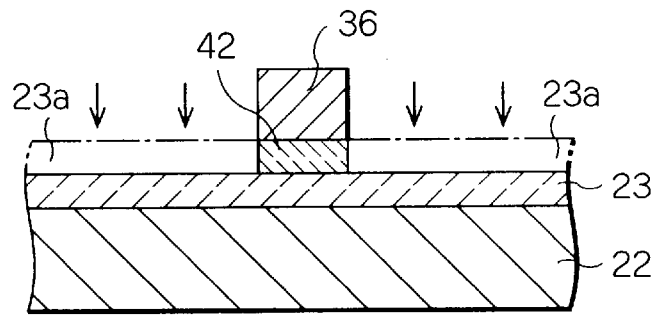
Figure 6C:
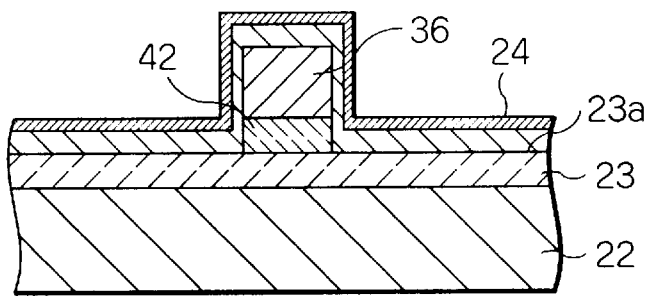

With the resist 36 left, a conductor film 24 composed of for example a Cu film for a thickness of around 70 nm and a bias magnetic field applying film 41 composed of for example a CoPt film for a thickness of around 30 nm are successively formed on the conductor film 24 (see FIG. 6C). At this point, to securely adhere the insulation film 23 composed of $Al_2O_3$ and the conductor film 24 composed of for example a Cu film, a transition metal film composed of for example Ti, Cr, or Ta may be formed therebetween.

Figure 6D:
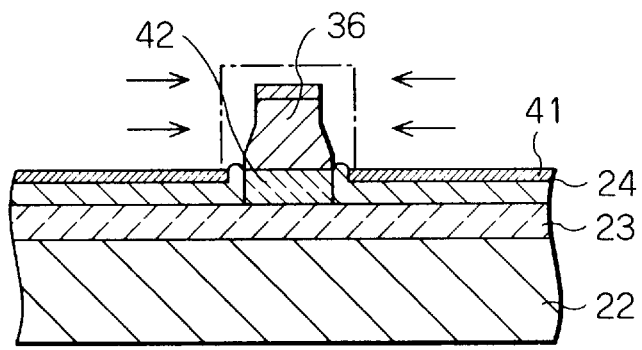
Figure 6E:
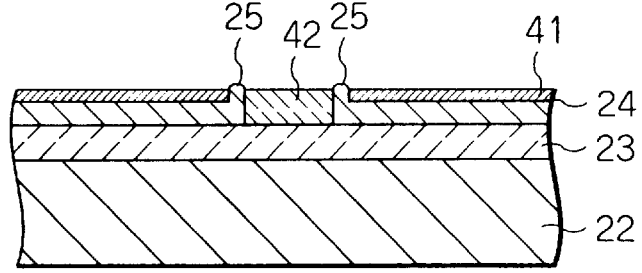

With an ion injection angle of around 80 degrees, the laminate film composed of the conductor film 24 and the bias magnetic field applying film 41 on the side surfaces of the resist 36 is selectively etched by the ion milling method (see FIG. 6D). With such a low ion injection angle, the laminate film formed in the recess portions 23a (in particular, the top layer of the bias magnetic field applying film 41 composed of for example a CoPt film) is hardly etched. The resist 36 is excessively side-etched and removed. Thus, a flat MR film forming surface is obtained. In addition, small protrusion portions 25 with a height of around 3 nm are formed at edge portions of the conductor film 24 on the reproducing track side (see FIG. 6E). Thus, the small protrusion portions 25 are formed on the MR film forming surface, not laminated with the bias magnetic field applying film 41. As with the first embodiment, small depression portions may be formed at the edge portions of the conductor films 24. Even in this structure, excellent off-track characteristics can be also obtained.

Thereafter, as with the first embodiment, an MR film 26 is formed and patterned. An insulation film 33 composed of for example $Al_2O_3$ and an upper shield layer 34 composed of for example a CoZrNb alloy are successively formed. The insulation film 33 functions as an upper magnetic gap. Thus, the shield type MR head shown in FIG. 5 is obtained. At this time, the gap length is the sum of the thickness of the insulation film 23 composed of $Al_2O_3$ and the thickness of the insulation film 42 composed of $SiO_2$. Thus, since the thickness of the insulation film 23 is 50 nm and the thickness of the insulation film 42 is 100 nm, the gap length is 150 nm. The lower shield layer 22 and the conductor film 24 are insulated by the insulation film 23 composed of $Al_2O_3$ with a thickness of 50 nm.

Further, a nonmagnetic undercoating film such as Ta film having, for example, a thickness of about 5 nm may be formed on an insulating film 42 in advance of forming of the spin valve film (MR film) 26.

Even after conductor films 24 as leads and bias magnetic field applying films 41 are formed, the nonmagnetic undercoating film (Ta film) remains on the insulating film 42, that is, at the track portion. Thus, the crystal property of the spin valve film at the track portion can be improved and the MR property of the MR film can be further improved.

As with the first embodiment, in the shield type MR head according to the second embodiment, excellent off-track characteristics are obtained and the linearity of the record magnetic gap is maintained. In addition, the bias magnetic field applying film 41 composed of for example a hard magnetic film or an antiferromagnetic film is buried in the recess portion 23a along with the conductor film 24 flatly (without a difference in level). Thus, the bias magnetic field applying film 41 does not adversely affect the MR film 26. In other words, if a difference in level takes place due to the bias magnetic field applying film 41, when the MR film composed of for example a spin valve film is formed thereon, the bent portion of the spin valve film due to the difference in level causes a magnetic domain to take place or the interfacial state of the magnetic film and the nonmagnetic conductor film to be uneven. Thus, the bias becomes unstable and thereby the operation of the MR device is adversely affected.

Third Embodiment

In the shield type MR heads according to the first and second embodiments, the distance between the lower shield layer 22 and the conductor film 24 is 50 nm. When the quality of the insulation film is controlled, the distance may be decreased to 20 nm or less. However, as the thickness of the insulation film decreases, an insulation defect due to a pin hole tends to increase. In a third embodiment of the present invention, such a problem of the shield type MR heads according to the first and second embodiments is solved.

Figure 7:
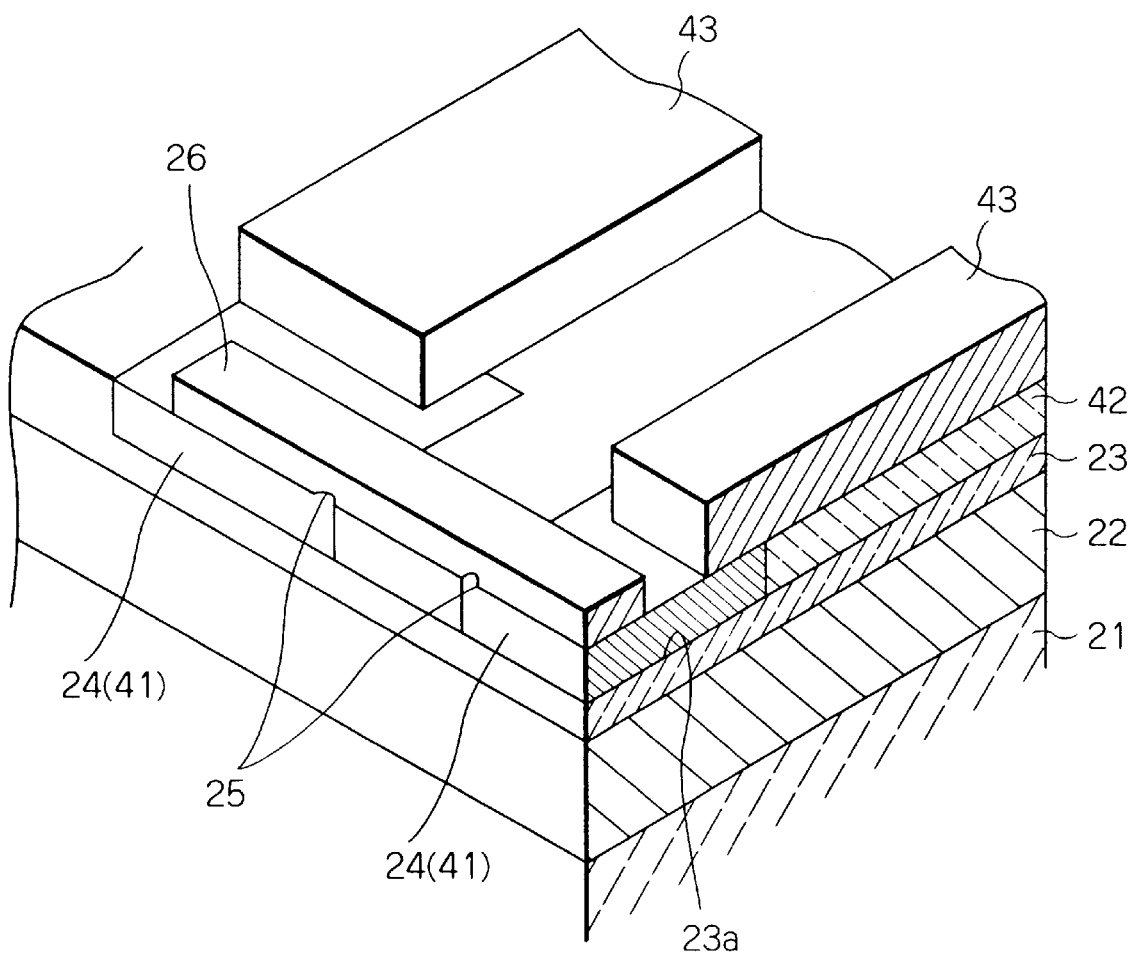
FIG. 7 is a partial sectional and perspective view showing a structure of principal portions of a shield type MR head according to a third embodiment of the present invention.

In the shield type MR head according to the third embodiment shown in FIG. 7, recess portions 23a in which a conductor film 24 is buried are formed only in the vicinity of an MR film 26. Except for the recess portions 23a, an insulation film 23 and an insulation film 42 are successively formed on a lower shield layer 22. This structure can be obtained in the following manner. When the recess portions 23a are formed in the insulation films 23 and 42, they are patterned so that only the vicinity of the MR film 26 becomes an etching area. A conductor film 43 is formed as new leads so that they are connected to the conductor film 24 buried in the recess portions 23a. Since the insulation films 23 and 42 with a thickness of the gap length are formed between the conductor film 43 and the lower shield layer 22, an insulation defect hardly takes place.

As a practical structure, an $Al_2O_3$ film as the insulation film 23 for a thickness of 50 nm and a $SiO_2$ film as the insulation film 42 for a thickness of 100 nm are formed. The depth of the recess portions 23a is 100 nm. Each of the recess portions 23a extends for 50 μm behind the rear edge of the MR film 26. A laminate layer (24) composed of a Cu film with a thickness of 80 nm and a CoPt film with a thickness of 20 nm is buried in the recess portions 23a. The conductor film 43 connected to the laminate layer is a laminate film composed of a Ti film with a thickness of 10 nm and a Cu film with a thickness of 200 nm. The conductor film 43 is connected to the Cu film so that they overlay with each other for an width of around 20 μm. When an insulation film is formed below the conductor film 43, the insulation detect further decreases.

When the conductor film 24 buried in the recess portions 23a is composed of a material (such as Mo, W, Ti, or Ta, or an alloy thereof) that has a higher melting point than Cu and Al and the conductor film 43 connected on the rear side of the MR film 26 is composed of a material (such as Cu or Al) that has a low specific resistance, the reliability of the leads exposed to the surface facing the medium can be improved against the corrosion and aged tolerance.

Fourth Embodiment

In a shield type MR head according to a fourth embodiment of the present invention, a conductor film buried in recess portions is composed of a material that is Mo, W, Ta, or an alloy thereof (such as MoW). Mo, W, Ta, or an alloy thereof has a higher corrosive resistance than that of Cu and Al. In addition, the etching ratio of such a material is low. Thus, when an MR film 26 is etched by the ion milling method or the like, it can be prevented from being excessively etched. Moreover, such a material used as a base film for a bias magnetic field applying film composed of such as a CoPt film or a FeMn film is superior to Cu and Al.

Next, with reference to FIGS. 8A, 8B, 8C, 8D, and 8E, the fabrication process and the structure of the shield type MR head according to the fourth embodiment of the present invention will be described.

An insulation film 23 composed of $Al_2O_3$ for a thickness of around 50 nm and an insulation film 42 composed of $SiO_2$ for a thickness of around 100 nm are successively formed on a lower shield layer 22 composed of for example a CoZrNb alloy with a thickness of around 2 μm. As with the second embodiment, recess portions 23a are formed (see FIG. 8A). After a resist 36 is removed, an alloy film composed of for example Mo of 70 atomic % and W of 30 atomic % is formed as a conductor film for leads by the sputter method with a thickness of around 100 nm (see FIG. 8B).

Figure 8A:
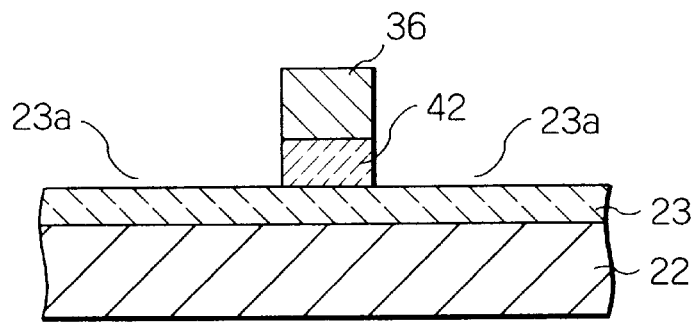
FIGS. 8A, 8B, 8C, 8D, and 8E are sectional views showing major steps of a fabrication process of a shield type MR head according to a fourth embodiment of the present invention.
Figure 8B:
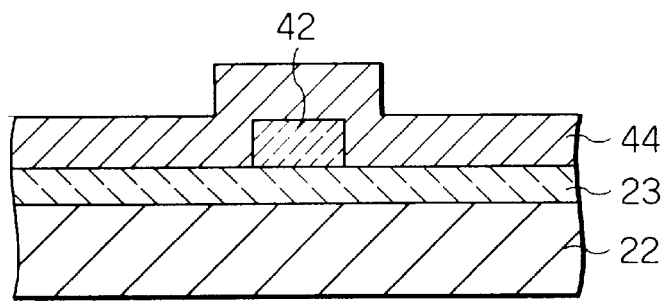
Figure 8C:
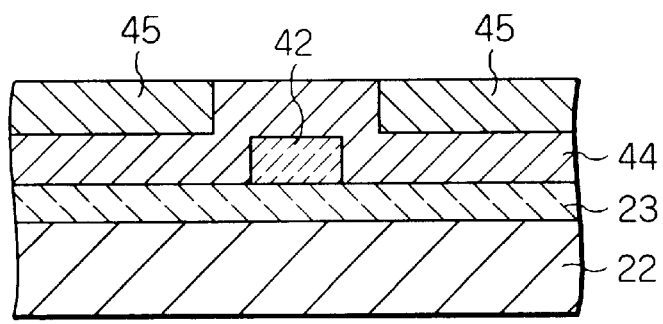
Figure 8D:
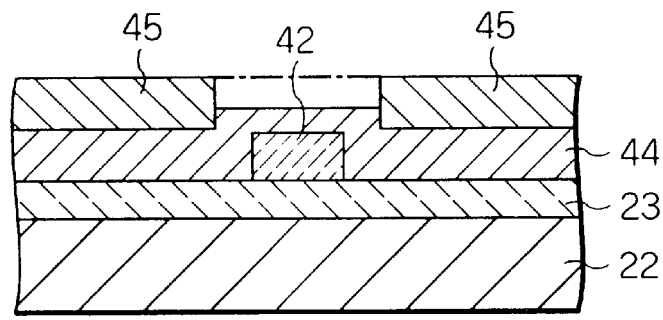

A resist 45 is formed on a lead forming portion (see FIG. 8C). The other portion is etched by the CDE method with a mixture gas of $O_2$ and $CF_4$ (see FIG. 8D). With a large selective ratio of the insulation film 42 and the MoW alloy film 44 in the etching process, the insulation film 42 is suppressed from being excessively etched. Thus, the surface on which the MR film is formed (the reproducing track portion and the lead portion) is flattened. In addition, small depression portions 46 can be formed at edge portions of the MoW alloy film 44 on the reproducing track side.

Figure 8E:
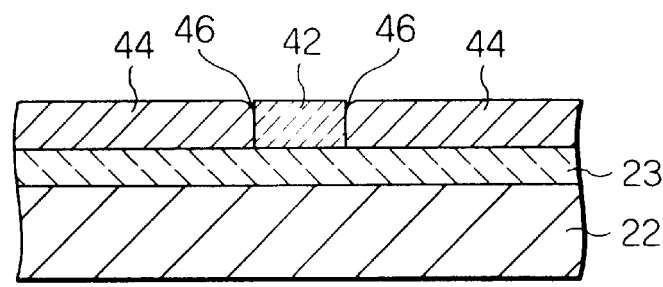

Thereafter, the resist 45 is removed (see FIG. 8E). As with the above-described embodiments, an MR film is formed and patterned. An insulation film (that functions as an upper magnetic gap) and an upper shield layer are successively formed. Thus, a shield type MR head is obtained. The material of the MR film is buried in the small depression portions 46. Thus, small protrusions are formed. As described above, the resist 45 is formed corresponding to the shape of the leads. With a mask of the resist 45, the MR film is etched. Consequently, small protrusions can be formed.

When a bias magnetic field applying film composed of for example a CoPt film is formed on the MoW alloy film, the CoPt film is milled or etched by the RIE method. The MoW alloy film is etched by the CDE method. At this point, with a large selective ratio of the insulation film 42 that become a magnetic gap and the MoW alloy film 44, the insulation film 42 can be prevented from being excessively etched. In addition, on the gap surface, a high resistance etching stopper composed of for example TiN may be formed. Moreover, the leads can be patterned by the milling method as with the first and second embodiments.

Fifth Embodiment

Next, with reference to FIGS. 9A, 9B, 9C, 9D, and 9E, a fabrication process and a structure of a shield type MR head according to a fifth embodiment of the present invention will be described.

An insulation film 23 composed of an $Al_2O_3$ film for a thickness of around 150 nm is formed on a lower shield layer 22 composed of for example CoZrNb alloy with a thickness of around 2 μm. A resist 36 is formed corresponding to the shapes of a reproducing track and leads (see FIG. 9A). The resist 36 is preferably formed in an inversed taper shape. The insulation film 23 and the lower shield layer 22 are successively etched by the ion milling method. Thus, recess portions 47 with a depth of around 180 nm are formed. At this point, with an ion injection angle of 40 degrees, tapers with an angle of 45 degrees are formed at edge portions of the recess portions 47 (see FIG. 9B).

Figure 9A:
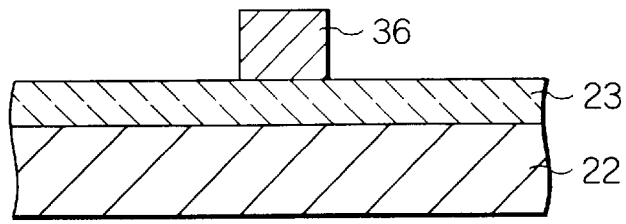
FIGS. 9A, 9B, 9C, 9D, and 9E are sectional views showing major steps of a fabrication process of a shield type MR head according to a fifth embodiment of the present invention and showing a structure of principal portions thereof.
Figure 9B:
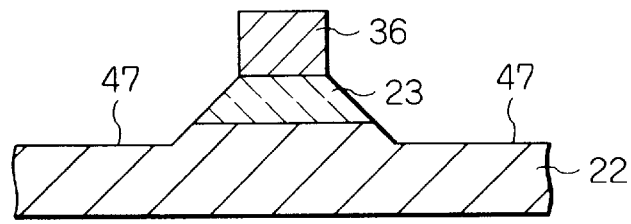
Figure 9C:
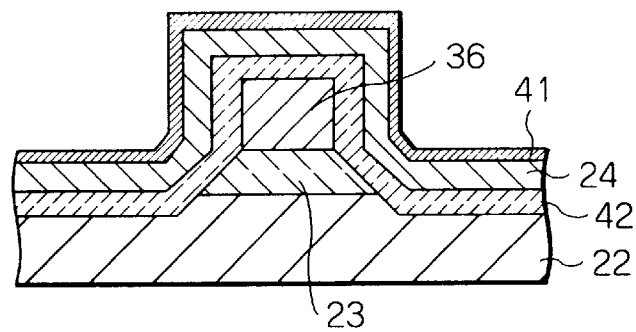
Figure 9D:
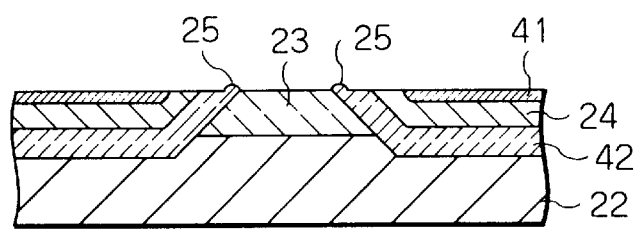
Figure 9E:
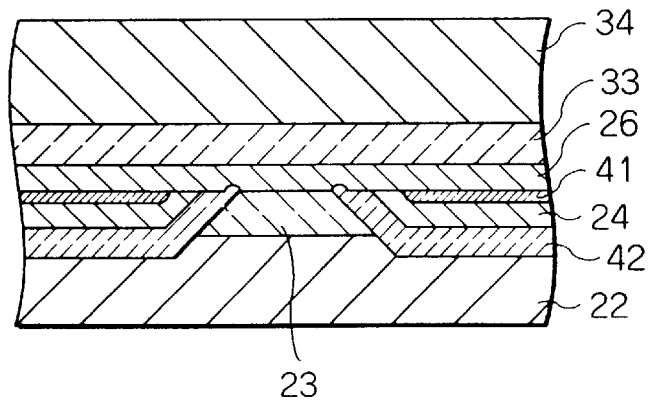

Next, with the resist 36 left, an insulation film 42 composed of a $SiO_2$ film for a thickness of 80 nm, a conductor film 24 composed of a Cu film for a thickness of 80 nm, and a bias magnetic field applying film 41 composed of a CoPt film for a thickness of 20 nm are successively formed (see FIG. 9C). With an ion injection angle of around 80 degrees in the ion milling process, a laminate film on the side surfaces of the resist 36 are etched. With such a low ion beam injection angle, the laminate film formed in the recess portion 47 (in particular, the top layer of the bias magnetic field applying film 41 composed of the CoPt film) is hardly etched.

Thereafter, the resist 36 is peeled out. Thus, a flat MR film forming surface is obtained. In addition, small protrusion portions 25 are formed at edge portions of the reproducing track side (see FIG. 9D).

Next, as with the above-described embodiments, an MR film 26 is formed and patterned. An insulation film 33 (that functions as an upper magnetic gap) and an upper shield layer 34 are successively formed (see FIG. 9E). Thus, a shield type MR head is obtained.

In the above-described shield type MR head, since the insulation film 42 formed between the conductor film 24 and the lower shield layer 22 can be thickened, excellent insulation characteristics can be accomplished without need to form a conductor film behind the MR film unlike with the third embodiment. When a material such as an MoW alloy that has a higher resistance than Cu is used, the recess portions can be formed for a depth of 350 nm. Thereafter, a $SiO_2$ film for a thickness of 80 nm, a MoW alloy film for a thickness of 250 nm, and a CoPt film for a thickness of 20 nm can be successively formed. The resultant structure can be patterned by the above-described method.

In the fifth embodiment, the recess portions are formed by the ion milling method. However, the recess portions can be formed by another physical/chemical etching method such as the RIE method. In this embodiment, the laminate film composed of the conductor film and the bias magnetic field applying filed is formed. However, instead of the laminate film, only the conductor film may be used.

Sixth Embodiment

Next, with reference to FIGS. 10A, 10B, 10C, 10D, and 10E, a fabrication process and a structure of a shield type MR head according to a sixth embodiment of the present invention will be described.

Figure 10A:
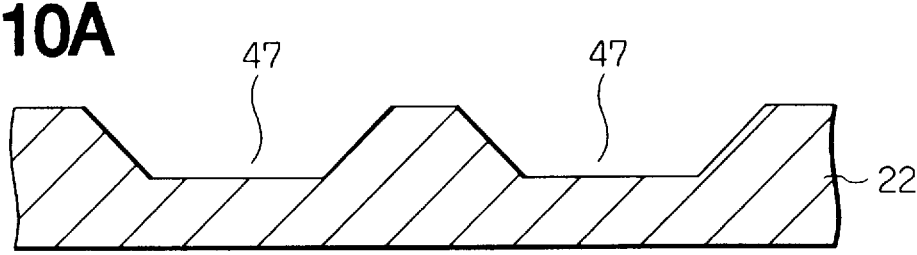
FIGS. 10A, 10B, 10C, 10D, and 10E are sectional views showing major steps of a fabrication process of a shield type MR head according to a sixth embodiment of the present invention and showing a structure of principal portions thereof.
Figure 10B:
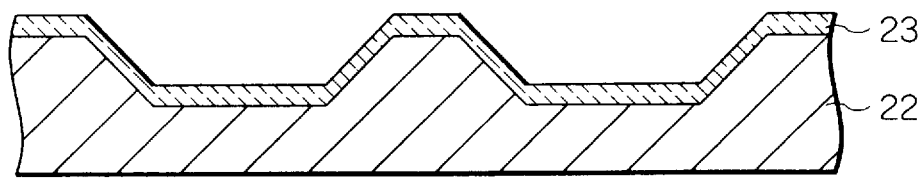
Figure 10C:
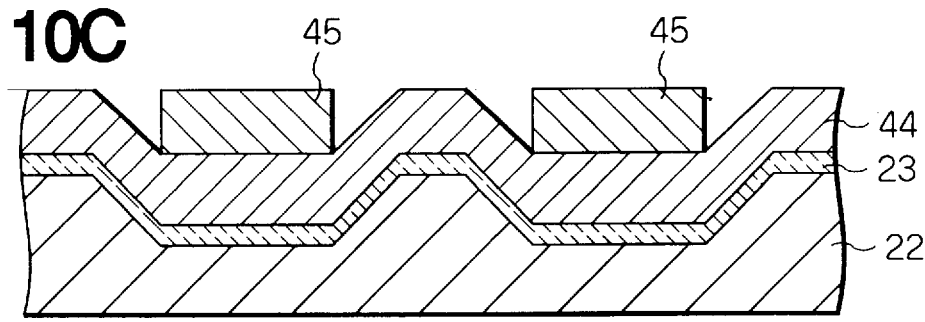
Figure 10D:
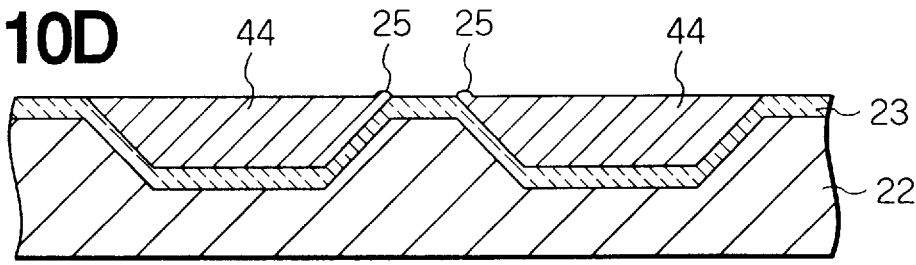
Figure 10E:
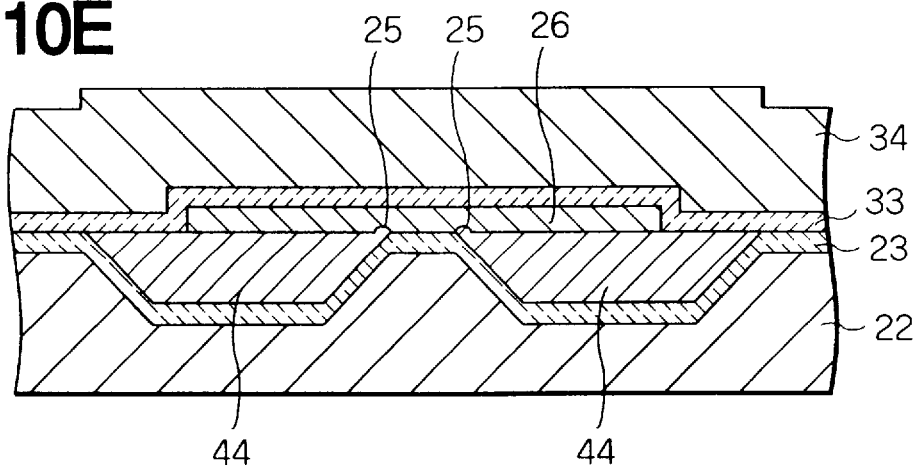

Recess portions 47 in which leads are buried are formed for a depth of around 350 nm on a lower shield layer 22 composed of a CoZrNb alloy with a thickness of around 2 $\mu$m by the ion milling method (see FIG. 10A). The edge portions of the recess portions are tapered with an angle of around 45 degrees. An insulation film 23 composed of an $Al_2O_3$ film is formed for a thickness of 150 nm (see FIG. 10B). An MoW alloy film 44 is formed for a thickness of 250 nm. A resist 45 is patterned corresponding to the shape of leads (see FIG. 10C). The resultant structure is etched by the CDE method so that the front surface of the insulation film 23 is exposed.

Thereafter, the resist 45 is removed. Thus, a flat MR film forming surface is obtained. In addition, small protrusion portions 25 are formed at edge portions of a the MoW alloy film 44 on a reproducing track side (see FIG. 10D).

Next, as with the above-described embodiments, an MR film 26 is formed and patterned. An insulation film 33 (that functions as an upper magnetic gap) and an upper shield layer 34 are successively formed. Thus, a shield type MR head is obtained (see FIG. 10E).

In this embodiment, the resist is patterned corresponding to the shape of the leads. With a mask of the resist, the MoW alloy film is etched by the CDE method and the resultant structure is flattened. Alternatively, the resultant structure can be flattened by the ion milling method. As a mask material, polystyrene or polyimide can be used as a substitute material of the resist.

Seventh Embodiment

Next, with reference to FIGS. 11A, 11B, 11C, 11D, and 11E, a fabrication process and a structure of a shield type MR head according to a seventh embodiment of the present invention will be described.

Figure 11A:
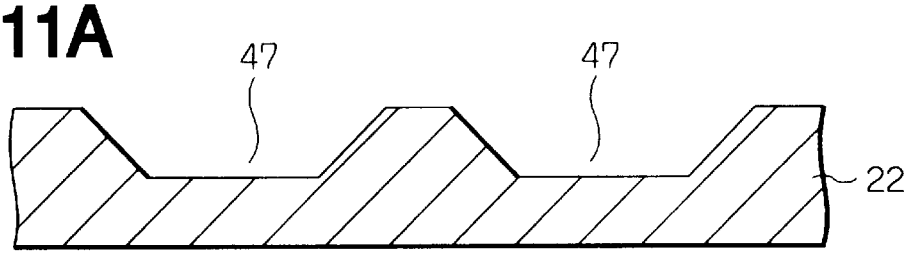
FIGS. 11A, 11B, 11C, 11D, and 11E are sectional views showing major steps of a fabrication process of a shield type MR head according to a seventh embodiment of the present invention and showing a structure of principal portions thereof.
Figure 11B:
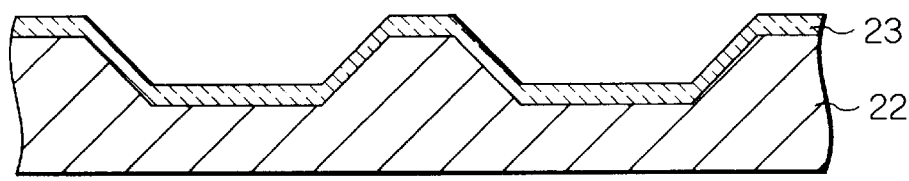
Figure 11C:
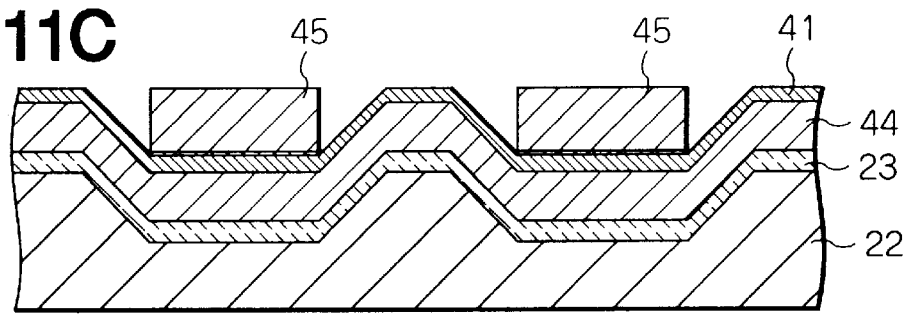
Figure 11D:
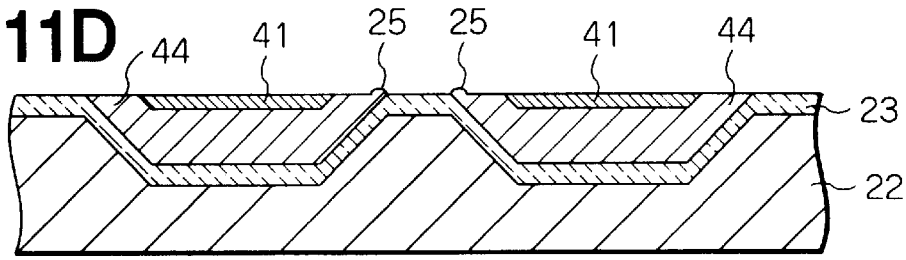
Figure 11E:
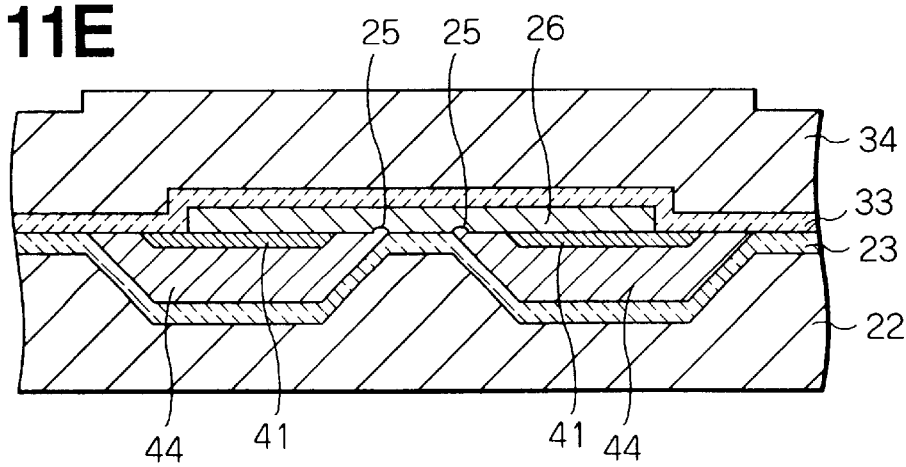

Recess portions 47 in which leads are buried are formed for a depth of around 370 nm on a lower shield layer 22 composed of for example a CoZrNb alloy with a thickness of around 2 $\mu$m by the ion milling method (see FIG. 11A). The edge portions of the recess portions 47 are tapered with an angle of 45 degrees. An insulation film 23 composed of an $Al_2O_3$ film is formed for a thickness of 150 nm (see FIG. 11B). A MoW alloy film 44 with a thickness of 250 nm and a bias magnetic field applying film 41 composed of a CoPt film with a thickness of 20 nm is formed. A resist 45 is patterned corresponding to the shape of the leads (see FIG. 11C). The bias magnetic field applying film 41 composed of the CoPt film is removed from the front surface of the structure by the ion milling method. The MoW alloy film 44 is etched by the CDE method so that the front surface of the insulation film 23 composed of the $Al_2O_3$ film is exposed.

Thereafter, the resist 45 is removed. Thus, a flat MR film forming surface is obtained. In addition, small protrusion portions are formed at edge portions of the MoW alloy film 44 on the reproducing track side (see FIG. 11D). As with the above-described embodiments, an MR film 26 is formed and patterned. In addition, an insulation film 33 (that functions as an upper magnetic gap) and an upper shield layer 34 are successively formed. Thus, a shield type MR head is obtained (see FIG. 11E).

In this embodiment, the MoW alloy film is used as the conductor film for the leads. However, instead of the MoW alloy film, a Cu film or the like can be used. In addition, a bias is applied to the MR film 26 by the hard magnetic film. However, by an antiferromagnetic film such as an FeMn alloy, the same effects can be obtained. The etching process for flattening the surface can be performed by the ion milling method.

Eighth Embodiment

Figure 12:
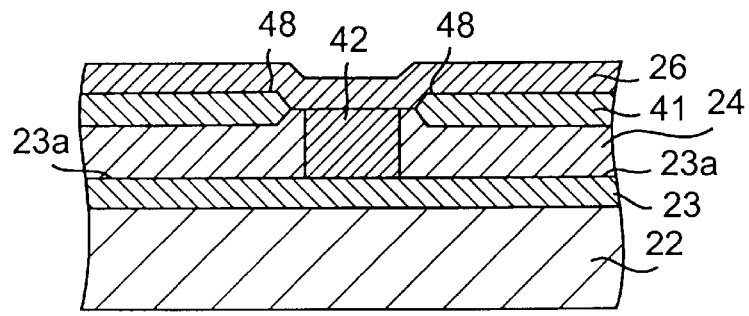
FIG. 12 is a sectional view showing a structure of principal portions of a shield type MR head according to an eighth embodiment of the present invention.

As with the second embodiment, an insulation film 23 composed of an $Al_2O_3$ film for a thickness of 50 nm and an insulation film 42 composed of a $SiO_2$ film for a thickness of 100 nm are formed on a lower shield layer 22. The insulation film 42 except for a track portion is etched by the RIE method. Thus, recess portions 23a are formed. A laminate film of a conductor film 24 composed of a Cu film for a thickness of 80 nm and a bias magnetic field applying film 41 composed of a CoPt film for a thickness of 25 nm is formed so that the thickness of the laminate film is larger than the depth of the recess portions 23a. In the condition of which the thickness of the laminate film is larger than the depth of the recess portions 23a, as with the second embodiment, with a very low ion injection angle, by the ion milling method, a resist on the side surfaces of the laminate layer is etched. The resist is peeled out. Thus, as shown in FIG. 12, an MR film forming surface of which small steps 48 are formed outside both edge portions of the track portion is formed.

As with the above-described embodiments, an MR film 26 is formed and patterned. An insulation film (that functions as an upper magnetic gap) and an upper shield layer are successively formed. With the shield type MR head, relatively excellent off-track characteristics can be obtained. Since the height of the steps 48 is as small as around 5 nm, they less affect the record magnetic gap.

Figure 13:
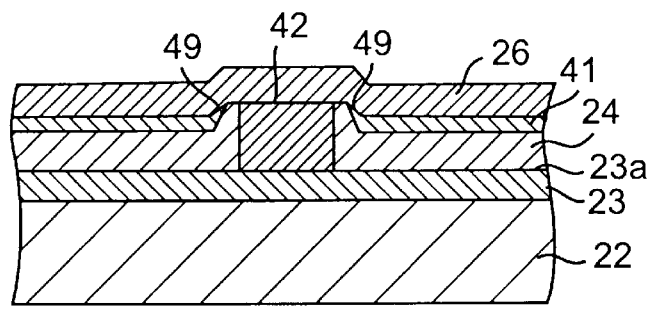
FIG. 13 is a sectional view showing another structure of principal portions of the shield type MR head according to the eighth embodiment of the present invention.
Figure 14:
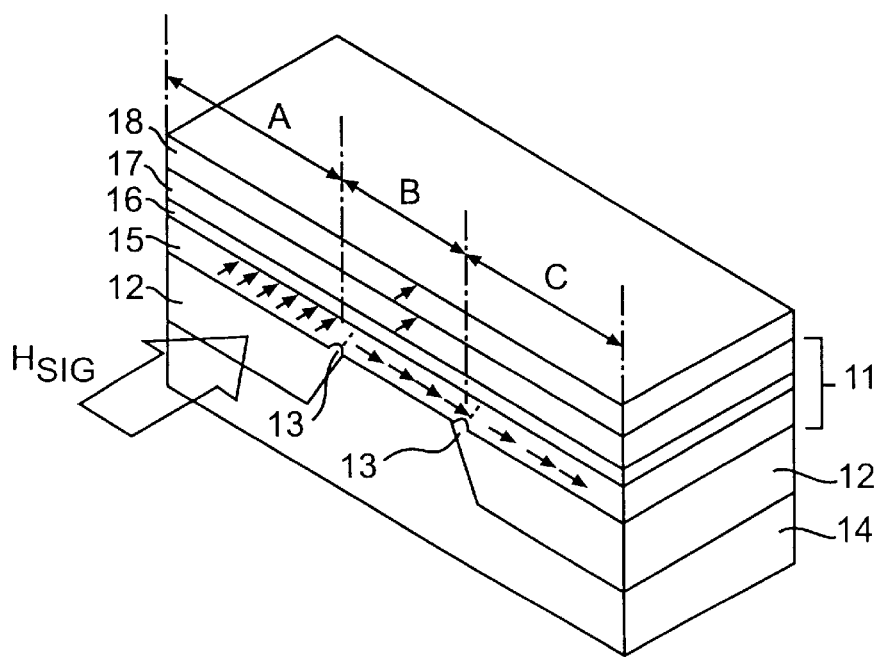
FIG. 14 is a perspective view for explaining off-track characteristics of an MR head according to the present invention.
Figure 15:
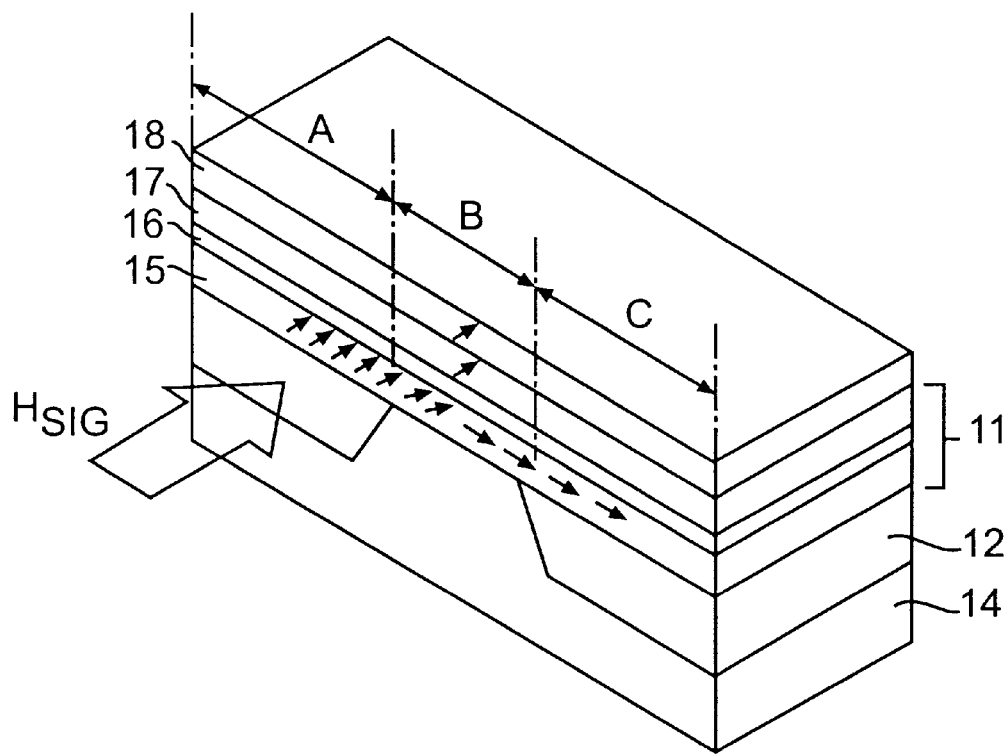
FIG. 15 is a perspective view for explaining off-track characteristics of a conventional MR head.
Figure 16:
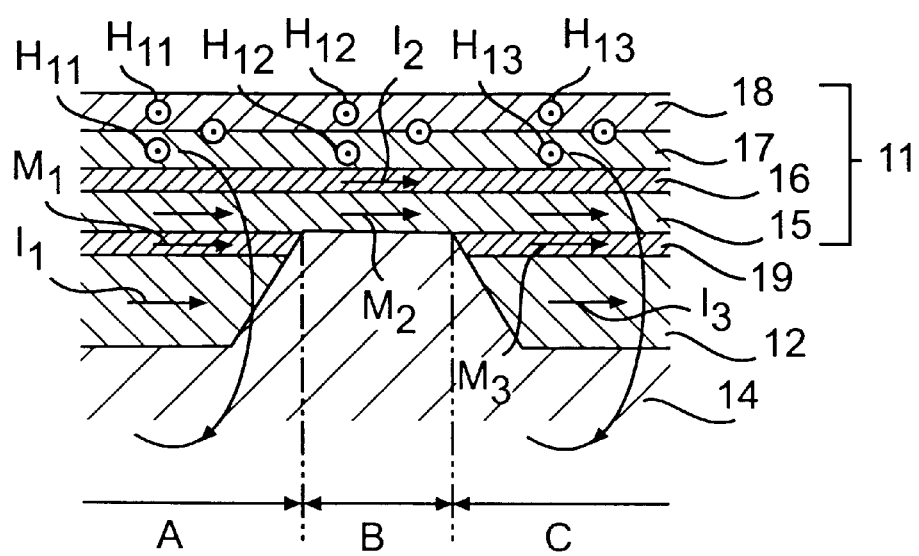
FIG. 16 is a schematic diagram showing the directions of current magnetic fields in the case that a spin valve film is used as an MR film.
Figure 17:
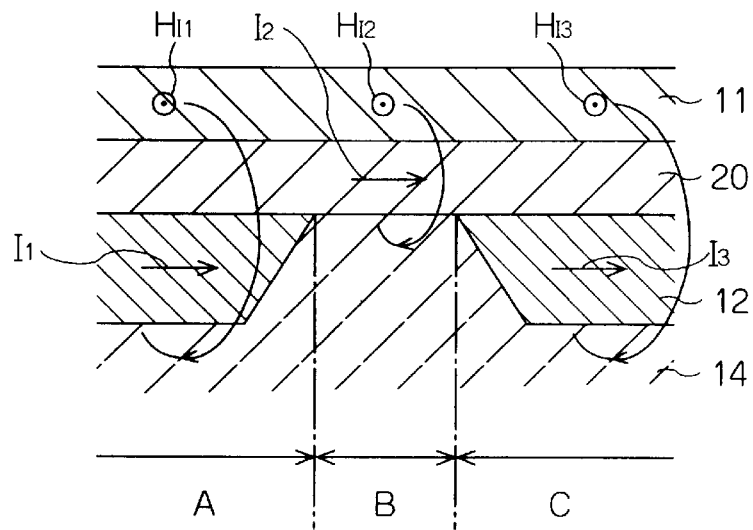
FIG. 17 is a schematic diagram showing the directions of current magnetic fields in the case that an anisotropic magnetoresistance effect film is used as an MR film.
Figure 18:
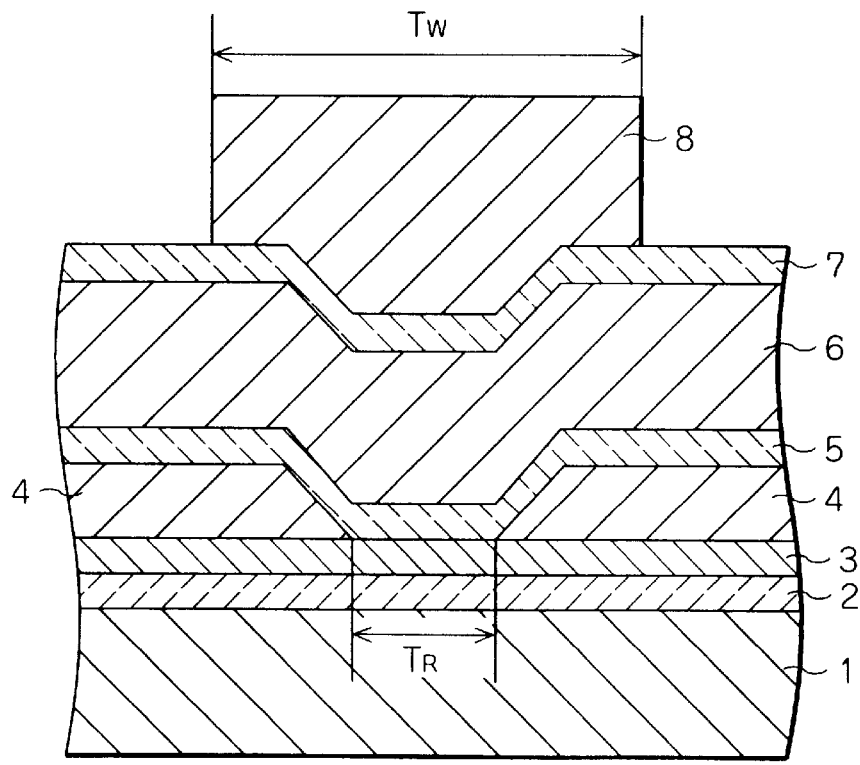
FIG. 18 is a sectional view showing a structure of a magnetic recording/reproducing head system having a conventional shield type MR head as a reproducing head.

In the same manner as described above, recess portions 23a are formed. A laminate film of a conductor film 24 composed of a Cu film for a thickness of 75 nm and a bias magnetic field applying film 41 composed of a CoPt film for a thickness of 20 nm is formed so that the thickness of the laminate film is smaller than the depth of the recess portions 23a. In the condition of which the thickness of the laminate film is smaller than the depth of the recess portions 23a, as with the second embodiment, with a very low ion beam injection angle, by the ion milling method, a resist on side surfaces of the laminate film is etched. The resist is peeled out. Thus, as shown in FIG. 13, an MR film forming surface of which the small steps 49 are formed outside both edges of the track portion is obtained.

As with the above-described embodiments, an MR film 26 is formed and patterned. An insulation film (that functions as an upper magnetic gap) and an upper shield are successively formed. Thus, a shield type MR head is obtained. With the shield type MR head, relatively excellent off-track characteristics can be obtained. Since the height of the small steps 49 is around 5 nm, they less affect the record magnetic gap.

As is clear from the above-described embodiments, a preferable fabrication method of the magnetoresistance effect type head is as follows.

A conductor film or a laminate film of a conductor film and a bias magnetic field applying film that becomes leads is buried in recess portions of which an insulation film is formed at least on the front surface thereof. The front surface of the resultant structure is flattened. The conductor film or the laminate film of the conductor film and the bias magnetic field applying film is formed. With a very low ion injection angle, by the ion milling method, the resist on the side surfaces is removed. The resist is removed. Small protrusion portions, depression portions, or steps are formed at edge portions on a track side. Thus, an almost flat MR film forming surface is obtained.

Alternatively, a conductor film such as a MoW alloy or a MoTa alloy that has a higher melting point and a higher resistance than Cu and that can be patterned by the CDE method is buried in recess portions. The conductor film is etched in the condition that the selective ratio of the conductor film and an insulation film for forming gaps is selected. The conductor film except for the recess portions is removed and flattened. Thereafter, an MR film, an upper magnetic gap, and an upper shield layer are successively formed.

As described above, according to the magnetoresistance effect type head of the present invention, when the track width is narrowed for a high record density, excellent track characteristics can be obtained and thereby a reproducing fringe can be suppressed. When the magnetoresistance effect type head is used as a recording/reproducing head system, the linearity (surface flatness) of the gap on the recording head side can be maintained. In addition, excellent insulation characteristics can be maintained. Moreover, when the magnetoresistance effect type head is used as a reproducing head, excellent recording/reproducing characteristics can be obtained along with a high record density.

Although the present invention has been shown and described with respect to best mode embodiments thereof, it should be understood by those skilled in the art that the foregoing and various other changes, omissions, and additions in the form and detail thereof may be made therein without departing from the spirit and scope of the present invention.

What is claimed is:

1. A magnetoresistance effect head, comprising:
    a magnetoresistance effect film for detecting a signal magnetic field, said magnetoresistance effect film having upper and lower surfaces and an entirely uniform thickness, a detecting area for detecting the signal magnetic field, and non-detecting areas formed on both sides thereof,
    wherein one pair selected from the group consisting of a pair of protrusions and a pair of depressions are formed at edge portions in a track width direction of the detecting area on at least one of the upper surface and the lower surface so as to suppress a transmittance of signal from the non-detecting areas to the detecting area, and a pair of conductor films or a pair of laminated films are buried in a recess portion of an insulated surface.

2. The magnetoresistance effect head as set forth in claim 1, wherein the
    pair of conductor films contact the lower surface of the magnetoresistance effect film at the edge portions of the detecting area and are adapted for supplying a current to said magnetoresistance effect film or
    the pair of laminate films are each composed of a conductor film and a bias magnetic field applying film for applying a bias magnetic field to the magnetoresistance effect film.

3. The magnetoresistance effect head as set forth in claim 2,
    wherein the pair of protrusions or the pair of depressions are formed on a lower surface side of said magnetoresistance effect film facing edge portions of a signal detecting area side of the conductor films or the laminate films.

4. The magnetoresistance effect head as set forth in claim 2, wherein inner edges of said pair of conductor films are located between inner edges of said pair of bias magnetic field applying films.

5. The magnetoresistance effect head as set forth in claim 1,
    wherein the height of the protrusions or the depressions from the upper surface of the detecting area is in the range from 1 to 10 nm.

6. The magnetoresistance effect head as set forth in claim 1, wherein said magnetoresistance effect film is a spin valve film composed of a pair of magnetic films and a non-magnetic film interposed between the pair of magnetic films.

7. A magnetic recording/reproducing head system, comprising:
    a reproducing head composed of the magnetoresistance effect head as set forth in claim 1;
    a lower magnetic layer magnetically shielding the magnetoresistance effect head; and
    a recording head composed of an induction magnetic head having an upper magnetic layer formed on said lower magnetic layer through a magnetic gap.

8. A magnetoresistance effect head including a magnetoresistance effect film having a signal detecting area and non-detecting areas formed on both sides of the signal detecting area, comprising:
    a lower shield layer;
    a lower insulation film formed on said lower shield layer and having recess portions on both sides of an area facing the signal detecting area;
    a conductor film buried in the recess portions so that a surface of the conductor film faces the non-detecting areas, wherein the surface of the conductor film facing the non-detecting areas and a surface of the lower insulation film facing the signal detecting area are on the same plane except for an area of a suppressing means;
    said suppressing means formed at edge portions of said conductor film on a signal detection area side and adapted for suppressing a transmittance of a signal from the non-detecting areas to the signal detecting area;
    the magnetoresistance effect film formed on the surfaces of the lower insulation film and the conductor film including said suppressing means, wherein an interface between the magnetoresistance effect film and the surfaces of the lower insulation film and the conductor film is on the same plane except for the area of the suppressing means;

an upper insulation film formed on said magnetoresistance effect film; and an upper shield layer formed on said upper insulation film.

9. The magnetoresistance effect head as set forth in claim 8,
wherein said suppressing means is composed of protrusion portions formed at said edge portions of said conductor film on a signal detecting area side.

10. The magnetoresistance effect head as set forth in claim 9,
wherein the height of the protrusion portions is in the range from 1 to 10 nm.

11. The magnetoresistance effect head as set forth in claim 8,
wherein said magnetoresistance effect film is a spin valve film composed of a pair of magnetic films and a non-magnetic film interposed between the pair of magnetic films.

12. The magnetoresistance effect head as set forth in claim 11, further comprising:
an antiferromagnetic film formed on one of the magnetic films.

13. The magnetoresistance effect head as set forth in claim 8,
wherein said lower insulation film is composed of two insulation layers composed of different materials.

14. The magnetoresistance effect head as set forth in claim 8, further comprising:
a bias magnetic field applying film formed between said conductor film and said magnetoresistance effect film and adapted for supplying a magnetic field to said magnetoresistance effect film.

15. The magnetoresistance effect head as set forth in claim 8,
wherein said suppressing means is composed of depression portions formed at said edge portions of said conductor film on a signal detecting area side.

16. The magnetoresistance effect head as set forth in claim 15,
wherein the height of the depression portions is in the range from 1 to 10 nm.

17. A magnetoresistance effect head comprising a magnetoresistance effect film for detecting a signal magnetic field, said magnetoresistance effect film having substantially flat upper and lower surfaces, a detecting area for detecting the signal magnetic field, and non-detecting areas formed on both sides thereof,
wherein one pair selected from the group consisting of a pair of protrusions, a pair of depressions, and a pair of steps are formed at edge portions in a track width direction of the detecting area on at least one of the upper surface and the lower surface, and the upper surface and lower surface of the detecting area have the same plane as the upper and lower surfaces of the non-detecting areas of the magnetoresistance effect film except at said one pair of protrusions, depressions, or steps.

18. The magnetoresistance effect head as set forth in claim 17, further comprising:
a pair of conductor films contacting to the lower surface of the magnetoresistance effect film at the edge portions of the detecting area and adapted for supplying a current to the magnetoresistance effect film, or a pair of laminate films each composed of a conductor film and a bias magnetic field applying film for applying a bias magnetic field to the magnetoresistance effect film, wherein the pair of conductor films or the pair of laminate films are formed in recess portions which are provided in an insulation film disposed under the magnetoresistance effect film.

19. The magnetoresistance effect head as set forth in claim 18,
wherein the protrusions, the depressions, or the steps are formed on the lower surface of said magnetoresistance effect film facing the conductor films or the laminate films.

20. The magnetoresistance effect head as set forth in claim 17,
wherein a height of the protrusions, the depressions, or the steps from the upper surface of the detecting area is in a range from 1 to 10 nm.

21. The magnetoresistance effect head as set forth in claim 17, wherein said magnetoresistance effect film is a spin valve film comprising a pair of magnetic films and a non-magnetic film interposed between said pair of magnetic films.

22. A magnetoresistance effect head comprising a magnetoresistance effect film having a signal detecting area and non-detecting areas disposed on both sides of the signal detecting area, said magnetoresistance effect head comprising:

a lower shield layer;

a lower insulation film formed on the lower shield layer and having recess portions on both sides of an area facing the signal detecting area;

a conductor film buried in the recess portions;

suppressing means formed at edge portions of the conductor film on a signal detection area side and adapted for suppressing a transmittance of a signal from the non-detecting areas to the signal detecting area;

an upper insulation film formed on the magnetoresistance effect film, which is formed on the suppressing means, the conductor film, and the lower insulation film; and an upper shield layer formed on the upper insulation film.

* * * * *